US011888234B2

(12) United States Patent
Walker et al.

(10) Patent No.: US 11,888,234 B2
(45) Date of Patent: Jan. 30, 2024

(54) ZIG-ZAG ANTENNA ARRAY AND SYSTEM FOR POLARIZATION CONTROL

(71) Applicant: FreeFall Aerospace, Inc., Tucson, AZ (US)

(72) Inventors: Christopher Kidd Walker, Tucson, AZ (US); Juan Carlos Lopez-Tonazzi, Tucson, AZ (US); Stefan Neal O'Dougherty, Tucson, AZ (US); Douglas Scott Stetson, Tucson, AZ (US)

(73) Assignee: FreeFall Aerospace, Inc., Tucson, AZ (US)

( * ) Notice: Subject to any disclaimer, the term of this patent is extended or adjusted under 35 U.S.C. 154(b) by 194 days.

(21) Appl. No.: 17/626,623

(22) PCT Filed: Jul. 16, 2020

(86) PCT No.: PCT/US2020/042279

§ 371 (c)(1),
(2) Date: Jan. 12, 2022

(87) PCT Pub. No.: WO2021/011744

PCT Pub. Date: Jan. 21, 2021

(65) Prior Publication Data

US 2022/0263250 A1 Aug. 18, 2022

Related U.S. Application Data

(60) Provisional application No. 62/875,594, filed on Jul. 18, 2019.

(51) Int. Cl.
*H01Q 21/24* (2006.01)
*H01Q 21/20* (2006.01)

(52) U.S. Cl.
CPC ........... *H01Q 21/205* (2013.01); *H01Q 21/24* (2013.01)

(58) Field of Classification Search
CPC ...... H01Q 1/38–48; H01Q 1/52; H01Q 19/10; H01Q 21/205; H01Q 21/24–26
See application file for complete search history.

(56) References Cited

U.S. PATENT DOCUMENTS

| | | | |
|---|---|---|---|
| 3,541,564 | A | 11/1970 | Fisk |
| 10,199,711 | B2 | 2/2019 | Walker et al. |

(Continued)

FOREIGN PATENT DOCUMENTS

| | | | |
|---|---|---|---|
| WO | 2017011732 | A1 | 1/2017 |

OTHER PUBLICATIONS

International Preliminary Report on Patentability for International Application No. PCT/US2020/042279, dated Jan. 18, 2022, 7 pages.

(Continued)

*Primary Examiner* — Hasan Islam
(74) *Attorney, Agent, or Firm* — Gerald W. Roberts; Dentons Bingham Greenebaum LLP

(57) ABSTRACT

An example antenna system includes a zig-zag antenna array. The zig-zag antenna array includes a stack of conductive disks and at least one crossed zig-zag antenna extending through the stack of conductive disks. The at least one crossed zig-zag antenna includes an element pair that includes a plurality of crossed zig-zag antenna segment pairs between the stack of conductive disks. A respective crossed zig-zag antenna segment pair extends between a respective lower conductive disk and a respective upper conductive disk. The example antenna system further includes a control circuit coupled to the element pair to switch the crossed zig-zag antenna segment pairs to drive the crossed zig-zag antenna segment pairs to transmit or receive radio frequency (Continued)

(RF) waves with polarization states that include vertical, horizontal, elliptical, or circular polarization.

20 Claims, 24 Drawing Sheets

(56) References Cited

U.S. PATENT DOCUMENTS

| | | | | |
|---|---|---|---|---|
| 10,454,165 | B2 * | 10/2019 | Shaw | H01Q 1/36 |
| 11,594,819 | B2 * | 2/2023 | Panther | H01Q 1/1207 |
| 2008/0204318 | A1 | 8/2008 | Thomas et al. | |
| 2018/0212334 | A1 | 7/2018 | Walker | |

OTHER PUBLICATIONS

International Search Report and Written Opinion for International Application No. PCT/US2020/042279, dated Oct. 14, 2020, 7 pages.

* cited by examiner

DETAIL A OF FIG. 1B

DETAIL A OF FIG. 3B

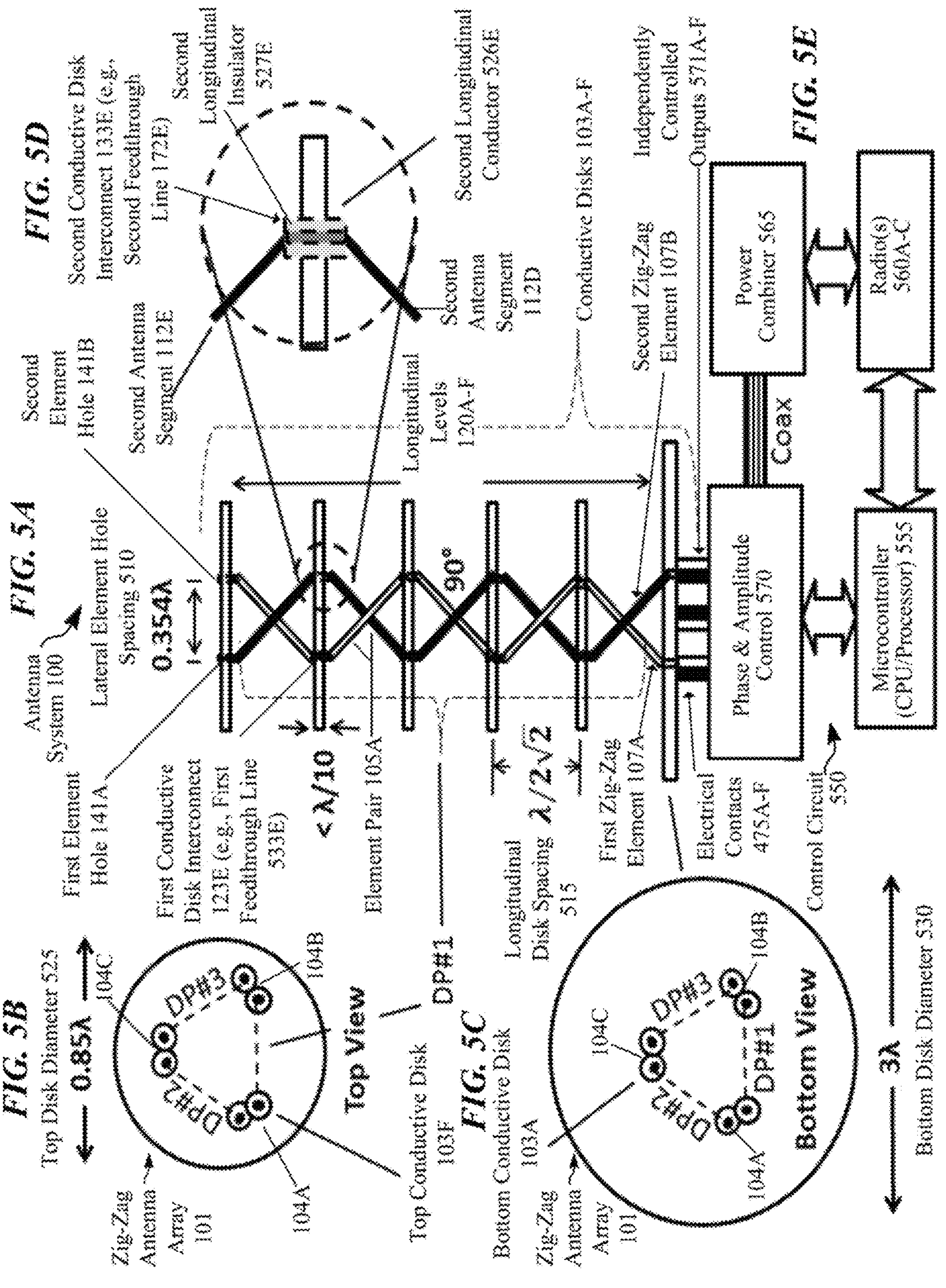
FIG. 5A
FIG. 5B
FIG. 5C
FIG. 5D
FIG. 5E
Antenna System 100
Lateral Element Hole Spacing 510
0.354λ
First Element Hole 141A
Second Element Hole 141B
First Conductive Disk Interconnect 123E (e.g., First Feedthrough Line 533E)
< λ/10
Element Pair 105A
DP#1
DP#2
DP#3
Longitudinal Disk Spacing 515
λ/2√2
First Zig-Zag Element 107A
Second Zig-Zag Element 107B
Electrical Contacts 475A-F
Control Circuit 550
Longitudinal Levels 120A-F
90°
Conductive Disks 103A-F
Second Antenna Segment 112E
Second Antenna Segment 112D
Second Conductive Disk Interconnect 133E (e.g., Second Feedthrough Line 172E)
Second Longitudinal Insulator 527E
Second Longitudinal Conductor 526E
Independently Controlled Outputs 571A-F
Phase & Amplitude Control 570
Microcontroller (CPU/Processor) 555
Power Combiner 565
Coax
Radio(s) 560A-C
Top Disk Diameter 525
0.85λ
104A
104B
104C
Top View
Top Conductive Disk 103F
Zig-Zag Antenna Array 101
Bottom Conductive Disk 103A
Bottom View
3λ
Bottom Disk Diameter 530

| | |
|---|---|
| 411 | top plate |
| 712 | monopoles board |
| 413 | connector |
| 714 | middle plate section |
| 715 | supplemental plate |
| 716 | plastic ring clamp |
| 717 | phase sync circuit shield |
| 418 | base plate |
| 719 | phase sync circuit |

| | |
|---|---|
| 418 | Base plate |
| 802A-D | First layer cross pol pair X4 |
| 413 | Lower middle plate |
| 419A-H | Optional connector X8 |
| 815A-D | Phase sync board X4 |
| 416 | Upper middle plate |
| 807A-D | Second layer cross pol pair x 4 |
| 411 | Top plate |

ZIG-ZAG ANTENNA ARRAY AND SYSTEM FOR POLARIZATION CONTROL

CROSS-REFERENCE TO RELATED APPLICATIONS

This application is a U.S. National Phase of International Application No. PCT/US2020/042279, filed Jul. 16, 2020, which claims priority to U.S. Provisional Patent Application No. 62/875,594, filed on Jul. 18, 2019, titled "Zig-Zag Antenna Array and System for Polarization Control," the entire disclosures of which are incorporated by reference herein.

TECHNICAL FIELD

The present subject matter relates to an antenna with zig-zag structures separated by conductive disks to yield a compact antenna with high sensitivity and broad areal coverage that is capable of receiving and transmitting linear, horizontal, and circularly polarized signals, and other arrangements of the zig-zag structures with control circuitry and techniques for achieving beam directionality through a switching function.

BACKGROUND

Radio antennas are critical components of all radio equipment, and are used in radio broadcasting, broadcast television, two-way radio, communication receivers, radar, cell phones, satellite communications, and other devices. A radio antenna is an array of conductors electrically connected to a receiver or transmitter, which provides an interface between radio frequency (RF) waves propagating through space and electrical currents moving in the conductors to the transmitter or receiver. In transmission mode, the radio transmitter supplies an electric current to antenna terminals, and the antenna radiates the energy from the current as electromagnetic waves (radio waves). In reception mode, the antenna intercepts some of the power of an electromagnetic wave in order to produce an electric current at the antenna terminals, which is applied to a receiver for amplification.

One type of radio antenna is a phased array line feed antenna. U.S. Patent Publication No. 2018/0212334, titled "Phased Array Line Feed for Reflector Antenna," corresponding to U.S. patent application Ser. No. 15/744,625, filed on Jan. 12, 2018, and incorporated by reference herein, discloses the phased array line feed antenna. The phased array lined feed antenna is typically optimized for continuous, electronic beam steering in association with or without a spherical reflector (e.g., spherical balloon reflector). U.S. Pat. No. 10,199,711 B2, titled "Deployable Reflector Antenna," corresponding to U.S. patent application Ser. No. 15/154,760, filed on May 13, 2016, and incorporated by reference herein, discloses the spherical balloon reflector.

An example suitable application for the phased array line feed antenna is space applications. For applications that require electronic RF beam steering, driving electronics are needed to control the phased array line feed antenna. For example, phase shifters can be utilized to electronically steer the RF beam.

Being sensitive to one linear polarization makes the phased array line feed antenna susceptible to signal fading if the orientation of the other antenna to which the phased array line feed is communicating changes. This is a potential problem for users with handheld devices, mobile devices, or for satellite communication systems where polarization changes can potentially occur due to spacecraft motion or via Faraday rotation as a signal propagates through the Earth's magnetic field. In addition, modern communication systems (e.g., fifth generation of cellular network technology known as 5G) often increase data volume or the number of supported users by transmitting and receiving signals on orthogonal polarizations. Accordingly, a need exists for a compact antenna structure that is sensitive to and can switch between vertical, horizontal, right hand circular, and left hand circular polarizations.

SUMMARY

In an example, an antenna system includes a zig-zag antenna array. The zig-zag antenna array includes a conductive disk stack of conductive disks and at least one crossed zig-zag antenna extending transversely through the conductive disk stack of conductive disks. The at least one crossed zig-zag antenna includes an element pair that includes a plurality of crossed zig-zag antenna segment pairs between the conductive disk stack of conductive disks. A respective crossed zig-zag antenna segment pair extends between a respective lower conductive disk and a respective upper conductive disk. The example antenna system further includes a control circuit coupled to the element pair to switch the crossed zig-zag antenna segment pairs to drive the crossed zig-zag antenna segment pairs to transmit or receive radio frequency (RF) waves with polarization states that include vertical, horizontal, elliptical, or circular polarization. Addition of phase compensation electronics allows flexibility in the spacing of the conductive disks to meet size and performance constraints while maintaining the desired phasing between RF waves.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 5A is a block diagram of a geometric layout of the zig-zag antenna array of the antenna system of FIGS. 1A-B.

FIG. 5B depicts the geometric layout of a top conductive disk of the zig-zag antenna array.

FIG. 5C depicts the geometric layout of a bottom conductive disk of the zig-zag antenna array.

FIG. 5D is a zoomed in view of the encircled detail area of FIG. 5A and shows additional details of a second feed-through line type of a second conductive disk interconnect.

FIG. 5E is a block diagram of the control circuit of the antenna system, in which the control circuit includes a microcontroller and a radio.

DETAILED DESCRIPTION

Figure 1A:
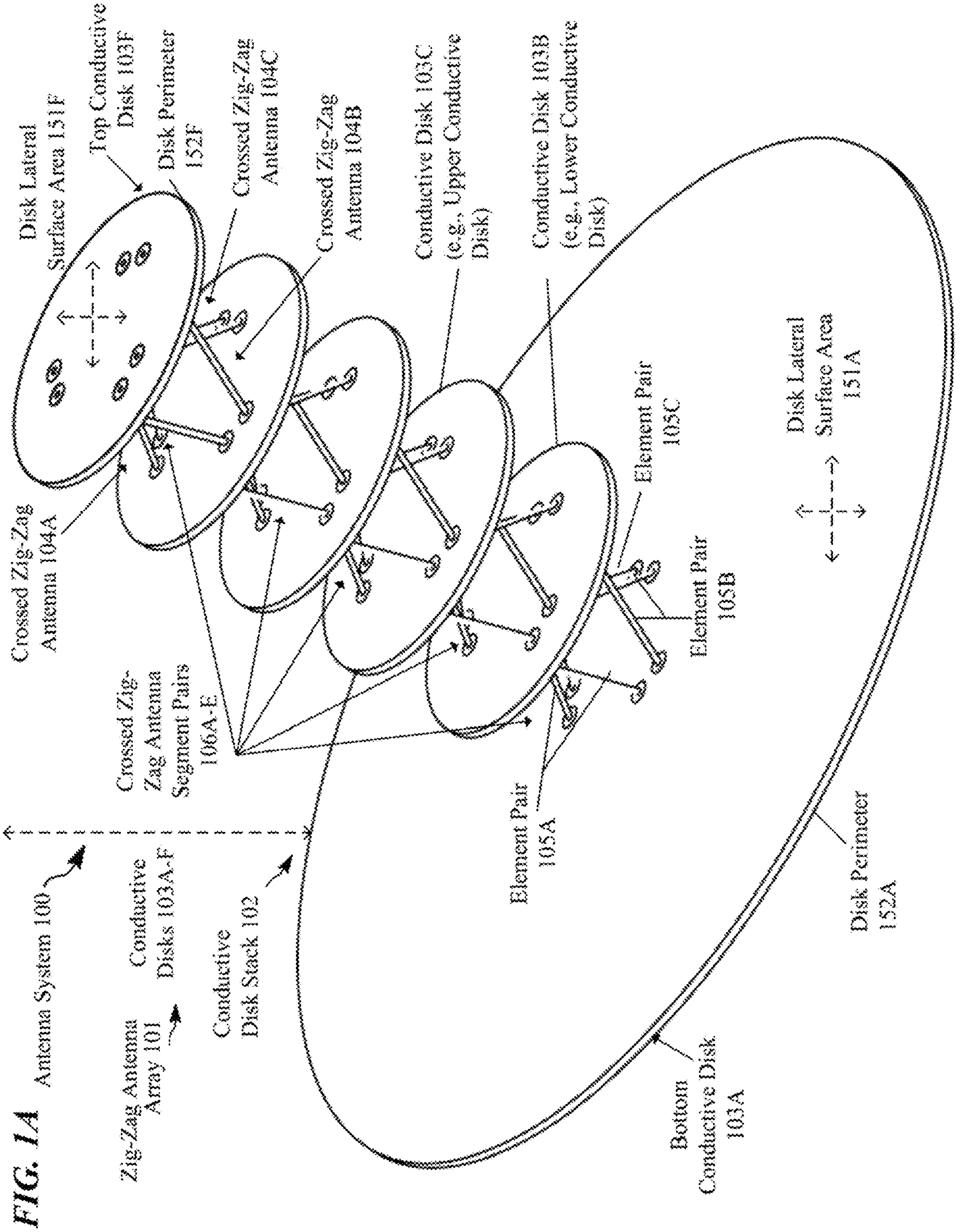
FIG. 1A is an isometric view of a zig-zag antenna array of an antenna system, in which a zig-zag antenna array includes a conductive disk stack of multiple (e.g., six) conductive disks and multiple (e.g., three) crossed zig-zag antennas with element pairs extending through the conductive disk stack.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the electromagnetic (EM) radiation, such as RF waves, light waves, or other EM signals.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The terms "substantially" and "approximately" mean that the parameter value or the like varies up to ±10% from the stated amount. For example, when used in connection with a point of reference, "substantially orthogonal" means 81-99° to the point of reference, "substantially longitudinally" means 81-99° to the point of reference, "substantially parallel" means 162-198° to the point of reference, and "substantially laterally" means 162-198° to the point of reference. Implementations of the antenna system and related components can be utilized at an "approximate design frequency," which means more than one RF frequency.

The orientations of the zig-zag antenna arrays, associated components and/or any complete devices incorporating a zig-zag antenna array such as shown in any of the drawings, are given by way of example only, for illustration and discussion purposes. In operation for a particular RF processing application, a zig-zag antenna array may be oriented in any other direction suitable to the particular application of the zig-zag antenna array, for example upright, sideways, or any other orientation. Also, to the extent used herein, any directional term, such as lateral, longitudinal, up, down, upper, lower, top, bottom and side, are used by way of example only, and are not limiting as to direction or orientation of any zig-zag antenna array or component of a zig-zag antenna array constructed as otherwise described herein. Reference now is made in detail to the examples illustrated in the accompanying drawings and discussed below.

FIG. 1A is an isometric view of a zig-zag antenna array 101 of an antenna system 100. The zig-zag antenna array 101 includes a conductive disk stack 102 of multiple (e.g., six) conductive disks 103A-F and multiple (e.g., three) crossed zig-zag antennas 104A-C with element pairs 105A-C extending through the conductive disk stack 102. Element pairs 105A-C can extend diagonally for monopoles, longitudinally (e.g., vertical) for interconnects, and transverse (e.g., horizontal) for the non-radiating waveguides.

As will be further explained below, various conductive disk interconnects 123A-F, 133A-F extend longitudinally (e.g., vertically) across each of the conductive disks 103A-F or a subset of the conductive disks 103A-F. However, the conductive disk interconnects 123A-F, 133A-F can also extend laterally (e.g., horizontally) across each of the conductive disks 103A-F or a subset of the conductive disks 103A-F. Conductive disk stack 102 includes a bottom conductive disk 103A and a top conductive disk 103F with four conductive disks 103B-E sandwiched between the bottom conductive disk 103A and the top conductive disk 103F. As shown in the example, the conductive disks 103A-F are conductive plates with respective lateral axes (e.g., respective horizontal axes) that are substantially parallel and the conductive disks 103A-F are aligned to center around a common longitudinal axis (e.g., vertical axis) to form the conductive disk stack 102. Each of the conductive disks 103A-F has a respective disk lateral surface area 151A-F or a respective disk perimeter 152A-F that is shaped as a circle. Alternatively, the disk lateral surface area 151A-F or the respective disk perimeter 152A-F can be shaped as an oval, polygon (e.g., irregular or regular), or a portion thereof.

Generally, the antenna system 100 includes the zig-zag antenna array 101 and the zig-zag antenna array 101 has at least one crossed zig-zag antenna 104A extending transversely through the conductive disk stack 102 of conductive disks 103A-F. The at least one crossed zig-zag antenna 104A includes an element pair 105A. The element pair 105A includes a plurality of crossed zig-zag antenna segment pairs 106A-E between the conductive disk stack 102 of conductive disks 103A-F. With the crossed zig-zag antenna segment pairs 106A-E, when respective first antenna segments 111A-E and respective second antenna segments 112A-E physically crossed, a 90 degree shift is created, which allows for polarization control unlike a linear phased array.

Figure 1B:
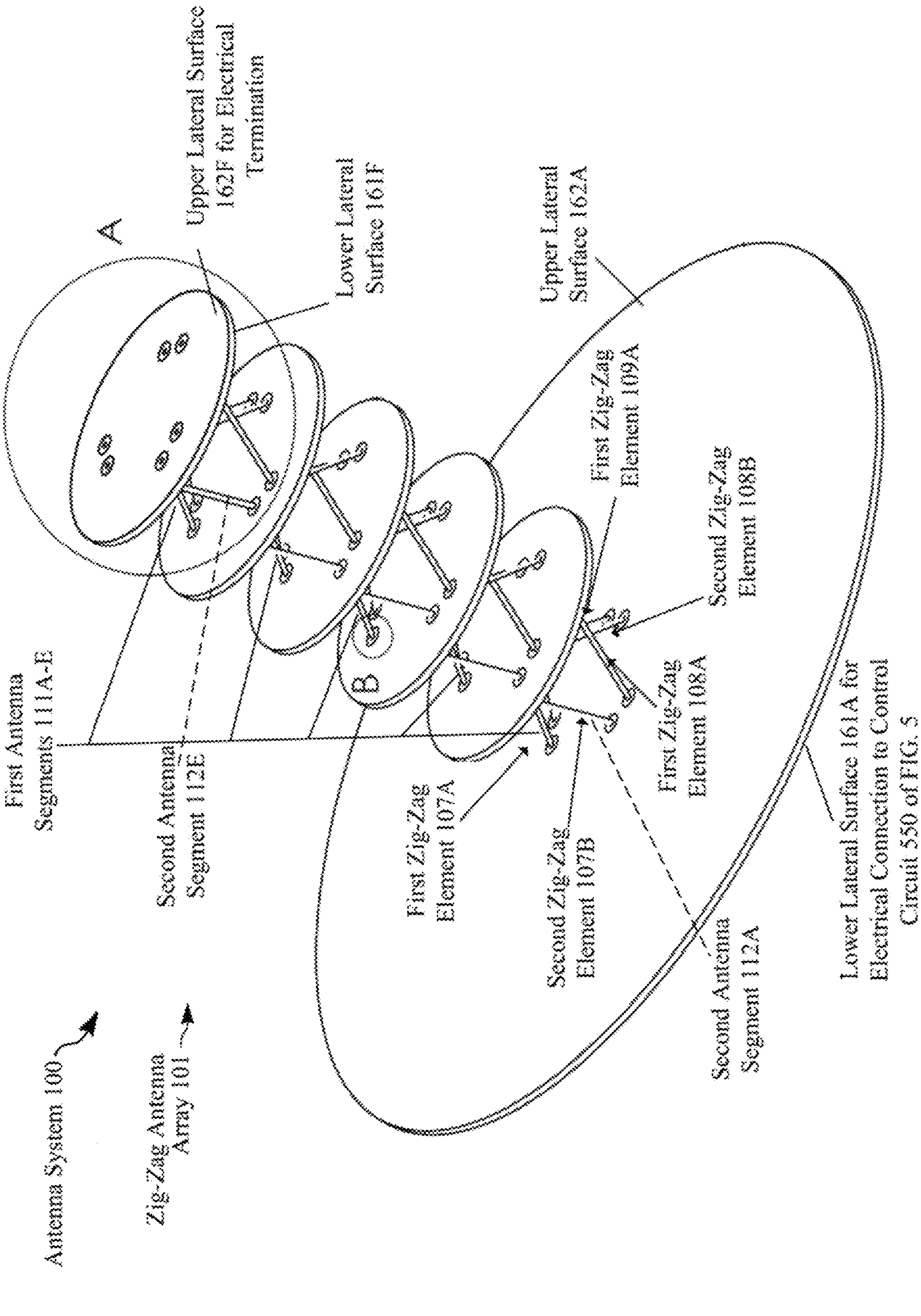
FIG. 1B is another isometric view of the zig-zag antenna array of FIG. 1A, showing first antenna segments and second antenna segments and encircled detail areas to show context for the zoomed in views of FIGS. 2A-B.

Three crossed zig-zag antennas 104A-C are shown in FIGS. 1A-B and each of the three crossed zig-zag antennas 104A-C extend transversely through the conductive disk stack 102 of conductive disks 103A-F. Each crossed zig-zag antenna 104A-C includes a respective element pair 105A-C (e.g., driven or passive), which can be driven or operated passively (e.g., not driven). Each of the three element pairs 105A-C includes a respective plurality (five) of crossed zig-zag antenna segment pairs 106A-E.

As shown, a respective crossed zig-zag antenna segment pair 106A-E extends between a respective lower conductive disk and a respective upper conductive disk. More specifically, a respective crossed zig-zag antenna segment pair 106A extends between a respective lower conductive disk 103A and a respective upper conductive disk 103B. A respective crossed zig-zag antenna segment pair 106B extends between a respective lower conductive disk 103B and a respective upper conductive disk 103C. A respective crossed zig-zag antenna segment pair 106C extends between a respective lower conductive disk 103C and a respective upper conductive disk 103D. A respective crossed zig-zag antenna segment pair 106D extends between a respective lower conductive disk 103D and a respective upper conductive disk 103E. A respective crossed zig-zag antenna segment pair 106E extends between a respective lower conductive disk 103E and a respective upper conductive disk 103F.

Although not shown in FIG. 1A, but shown in FIGS. 5-6, the antenna system 100 includes a control circuit 550 coupled to the element pair 105A to switch the crossed zig-zag antenna segment pairs 106A-E to drive the crossed zig-zag antenna segment pairs 106A-E to transmit or receive radio frequency (RF) waves with polarization states that include vertical, horizontal, elliptical, and circular polarization. The control circuit 550 can drive all five respective crossed zig-zag antenna segment pairs 106A-E of each of the three element pairs 105A-C with different polarization states of vertical, horizontal, and circular polarization.

The various zig-zag antenna array 101 constructs disclosed herein can be manufactured using a variety of techniques, including casting, layering, injection molding, machining, plating, milling, depositing one or more conductive coatings, or a combination thereof. For example, the conductive disks 103A-F and element pairs 105A-C can be casted and molded separately and then mechanically fastened together. Alternatively, the conductive disks 103A-F of conductive disk stack 102 and element pairs 105A-C can be formed using casting or injection molding to form a single integral piece. Secondary machining operations, including laser ablation, can be used, for example, to create the shape of the conductive disks of 103A-F and element pairs 105A-C, by burning away or otherwise removing undesired portions, for example, to taper the conductive disks 103A-F; form element holes 141A-B, 142A-B, and 143A-B (see FIG. 2B); form openings (e.g., passages) in conductive disks 103A-F for first conductive disk interconnects 123A-F and second conductive disk interconnects 133A-F to pass through the conductive disks 103A-F substantially laterally in the case of a shielded transmission line 124*x*, 134*x* type of conductive disk interconnect 123*x*, 133*x* (see FIGS. 3B and 4A-D) and or substantially longitudinally in the case of a feedthrough line 171*x*, 172*x* (see FIGS. 5A and 5D) type of conductive disk interconnect 123*x*, 133*x*.

Conductive layers or films can be deposited as the first conductive disk interconnects 123A-F and second conductive disk interconnects 133A-F or conductive disks can be utilized, for example, by plating that plane before stacking more layers on top of it. Conductive disks 103A-F, element pairs 105A-C, lateral conductors 136*x* of first and second shielded transmission lines 124*x*, 134*x* longitudinal conductors 526*x* of first and second feedthrough lines 171*x*, 172*x* may be formed of any suitable conductor or metallization layer, such as copper, aluminum, silver, etc., or a combination thereof. Hence, the same or different conductive materials may be used to form the first conductive disk interconnects 123A-F and second conductive disk interconnects 133A-F with additional insulating material or shielding materials (e.g., coaxial cable). In some examples, blind vias or through hole types of vias and various other types of electrical interconnects, such as surface interconnects, internal or external conductive traces, and planar electrodes can be utilized for electrical connection for example in the zig-zag antenna array 101 or for electrical connection to the control circuit 550.

Figure 2A:
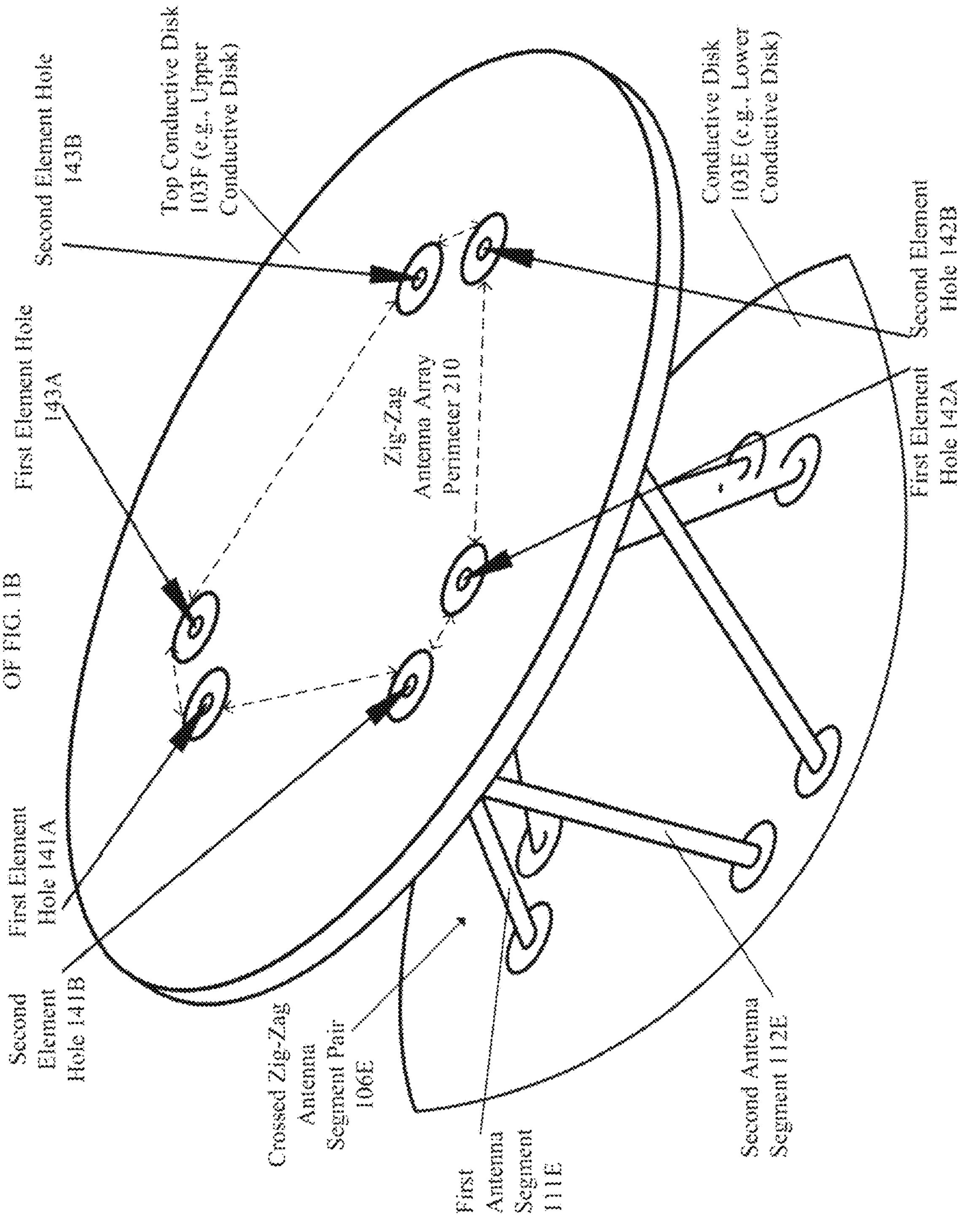
FIG. 2A is a zoomed in view of the encircled detail area A of FIG. 1B and shows additional details of first element holes, second element holes, and crossed zig-zag antenna segment pairs.
Figure 2B:
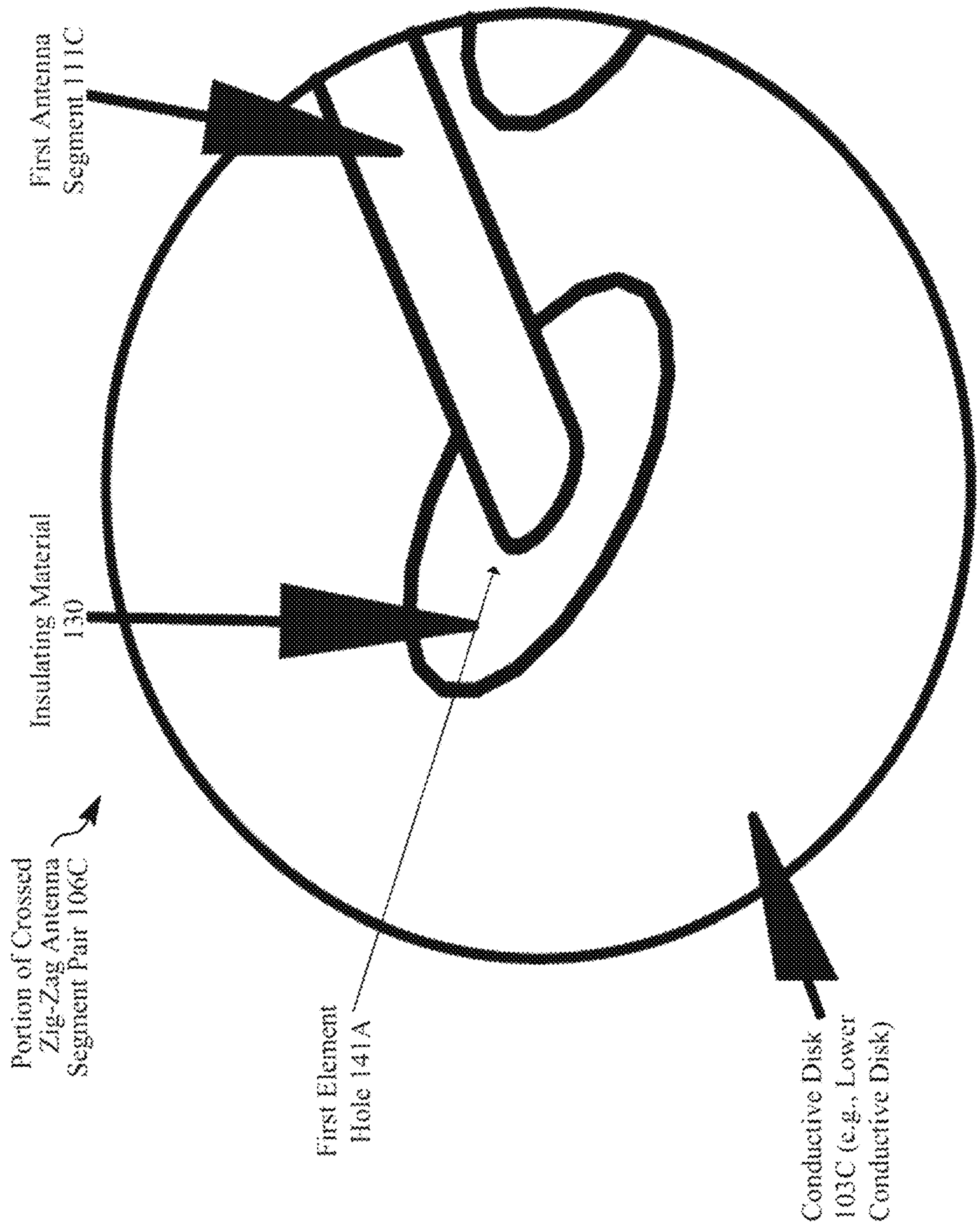
FIG. 2B is a zoomed in view of the encircled detail area B of FIG. 1B and shows additional details of a portion of a crossed zig-zag antenna segment pair extending from a conductive disk.

FIG. 1B is another isometric view of the zig-zag antenna array 101 of FIG. 1A, showing first antenna segments 111A-E and second antenna segments 112A-E and encircled detail areas to show context for the zoomed in views of FIGS. 2A-B. Generally, the element pair 105A includes, a first zig-zag element 107A formed of multiple first antenna segments 111A-E, and a second zig-zag element 107B formed of multiple second antenna segments 112A-E. First antenna segments 111A-E and second antenna segments 112A-E are metal rods that are formed into crossed monopoles at approximately 90 degrees to each other to create crossed zig-zag antenna segment pairs 106A-E. In one example, the length of the monopoles in each layer (e.g., first antenna segments 111A-E) of first zig-zag element 106A is half a wavelength (k). With such a construct, the phase different between the metal rods can be played with to adjust the polarization state. More specifically in FIG. 1B, each of the three element pairs 105A-C includes, a respective first zig-zag element 107A, 108A, and 109A formed of respective multiple first antenna segments 111A-E, and a respective second zig-zag element 107B, 108B, and 109B formed of multiple second antenna segments 112A-E. In the view of FIGS. 1A-B only the first zig-zag element 109A of the element pair 105C is visible; however, it should be understood that the element pair 105C also includes a second zig-zag element 109B. Although not shown in FIG. 1A, the antenna system 100 shown in FIG. 1A can include a plurality of zig-zag antenna arrays 101A, B . . . N (e.g., feeds) coupled to a hemispheric reflector or other portions (e.g., quadrant) of a spherical reflector.

A respective first antenna segment 111A-E extends diagonally from the respective lower conductive disk to the respective upper conductive disk. More specifically, a respective first antenna segment 111A extends diagonally from the respective lower conductive disk 103A to the respective upper conductive disk 103B. A respective first antenna segment 111B extends diagonally from the respective lower conductive disk 103B to the respective upper conductive disk 103C. A respective first antenna segment 111C extends diagonally from the respective lower conductive disk 103C to the respective upper conductive disk 103D. A respective first antenna segment 111D extends diagonally from the respective lower conductive disk 103D to the respective upper conductive disk 103E. A respective first antenna segment 111E extends diagonally from the respective lower conductive disk 103E to the respective upper conductive disk 103F.

A respective second antenna segment 112A-E extends diagonally from the respective lower conductive disk to the respective upper conductive disk. More specifically, a respective second antenna segment 112A extends diagonally from the respective lower conductive disk 103A to the respective upper conductive disk 103B. A respective second antenna segment 112B extends diagonally from the respective lower conductive disk 103B to the respective upper conductive disk 103C. A respective second antenna segment 112C extends diagonally from the respective lower conductive disk 103C to the respective upper conductive disk 103D. A respective second antenna segment 112D extends diagonally from the respective lower conductive disk 103D to the respective upper conductive disk 103E. A respective second antenna segment 112E extends diagonally from the respective lower conductive disk 103E to the respective upper conductive disk 103F. In some examples, the zig-zag antenna 104A may be only one layer, that is, a single zig-zag antenna segment pair 106A-E.

RF signals in the respective first antenna segment 111A-E and the respective second antenna segment 112A-E that are crossed to form a respective zig-zag antenna segment pairs 106A-E are combined to achieve polarization independent operation to create the zig-zag antenna 104A, enabling radial dual polarization control during transmission and reception of RF waves. The respective first antenna segment 111A and the respective second antenna segment 112A are orthogonal to each other enabling two linearly polarized signals that are out of phase or can be fed with different polarization states to enable circular polarization of RF waves. Each monopole (e.g., the respective first antenna segment 111A-E and the respective second antenna segment 112A-E) typically radiates both RF polarization states, even with one of the elements of the monopole pair turned off. With phase shifting and amplitude control and more than two monopole pairs, RF beam steering is achieved.

In the substantially parallel orientation of monopoles (e.g., first antenna segments 111A-E of first zig-zag element 107A) of FIGS. 3B, 4C-D, 7A-C, and 8A-D for example, elliptical polarization of RF waves is further achieved. Each monopole can radiate one and only one RF polarization state. In between layers (longitudinal levels 120A N), the monopoles are not permitted to radiate because of the shielded transmission lines 124A . . . N. This implementation can control polarization by feeding different phases and amplitudes of RF waves to each monopole in the pair and can steer by phase shifting different monopole pairs.

As shown in FIG. 1B, each of the conductive disks 103A-F includes a respective lower lateral surface 161A-F and a respective upper lateral surface 162A-F. The conductive disk stack 102 of conductive disks 103A-F includes a bottom conductive disk 103A at a lowest longitudinal level 120A for an electrical connection to the control circuit 550 of FIG. 5. The conductive disk stack 102 further includes a top conductive disk 103F at an uppermost longitudinal level 120F for an electrical termination of the element pair 105A-C. The bottom conductive disk 103A includes the respective crossed zig-zag antenna segment pair 106A positioned on the respective upper lateral surface 162A and the electrical connection to the control circuit 550 on the respective lower lateral surface 161A. The top conductive disk 103F includes the respective crossed zig-zag antenna segment 106E positioned below the respective lower lateral surface 161F and the electrical termination of the element pair 105A-C on the respective upper lateral surface 162F.

Three crossed zig-zag antennas 104A-C with three respective element pairs 105A-C are shown. More generally, the zig-zag antenna array 101 includes a plurality of crossed zig-zag antenna 104A-C. Each crossed zig-zag antenna 104A-C extends transversely through the conductive disk stack 102 of conductive disks 103A-F. Each crossed zig-zag antenna 104A-C includes a respective element pair 105A-C including a respective first zig-zag element 107A, 108A, 109A and a respective second zig-zag element 107B, 108B, 109B.

FIG. 2A is a zoomed in view of the encircled detail area A of FIG. 1B and shows additional details of first element holes 141A, 142A, 143A and second element holes 141B, 142B, 143B and crossed zig-zag antenna segment pair 106E. Generally, the respective first antenna segment 111A-E and the respective second antenna segment 112A-E cross each other in orthogonal directions between each of the conductive disks 103A-F to form the respective crossed zig-zag antenna segment pair 106A-E between the respective lower conductive disk and the respective upper conductive disk. For example, as shown the respective first antenna segment 111E and the respective second antenna segment 112E cross each other in orthogonal directions between a respective lower conductive disk 103E and a respective upper conductive disk 103F (e.g., top conductive disk 103F) to form the respective crossed zig-zag antenna segment pair 106E between the respective lower conductive disk 103E and the respective upper conductive disk 103F.

Generally, the respective lower conductive disk and the respective upper conductive disk each include a respective first element hole 141A for the respective first antenna segment 111A-E to extend between, and a respective second element hole 141B for the respective second antenna segment 112A-E to extend between. Hence, as shown, upper conductive disk 103F (and the lower conductive disk 103E), each include a first element hole 141A for first antenna segment 111E and a second element hole 141B for second antenna segment 112E of the crossed zig-antenna segment pair 106E of element pair 105A of the crossed zig-zag antenna 104A.

When zig-zag antenna array 101 includes three crossed zig-zag antennas 104A-C with three respective element pairs 105A-C like that shown, then three sets of respective element holes 141A-B, 142A-B, and 143A-B are formed—one set per element pair 105A-C. More specifically, the respective first zig-zag element 107A and the respective second zig-zag element 107B form a respective set of respective crossed zig-zag antenna segment pairs 106A-E between the conductive disk stack 102 of conductive disks 103A-F. Each conductive disk 103A-F or a subset 103A-E includes a respective set of element holes 141A-B, 142A-B, and 143A-B for each respective element pair 105A-C. The respective set of element holes 141A-B, 142A-B, and 143A-B include a first element hole 141A, 142A, and 143A for a respective first antenna segment 111A-E of the respective first zig-zag element 107A, 108A, and 109A. The respective set of element holes 141A-B, 142A-B, and 143A-B further include a second element hole 141B, 142B, and 143B for a respective second antenna segment 112A-E of the respective second zig-zag element 107B, 108B, and 109B.

As shown in FIG. 2A, a zig-zag antenna array perimeter 210 is defined by sets of element holes 141A-B, 142A-B, and 143A-B on each conductive disk. The zig zig-zag antenna array 210 perimeter in FIG. 2A is shaped as an irregular hexagon, but can also be shaped as a circle, oval, a polygon (e.g., an octagon formed by four sets of element holes), or a portion thereof. Polygons with a larger number of sides created by a greater number of crossed zig-zag antennas 104A-C allow for better control of an RF beam.

FIG. 2B is a zoomed in view of the encircled detail area B of FIG. 1B and shows additional details of a portion of a crossed zig-zag antenna segment pair 106C extending from a conductive disk 103C. As shown, a portion of the first antenna segment 111C of the crossed zig-antenna segment pair 106C is surrounded by an insulating material 130 in a first element hole 141A. The insulating material 130 can be a dielectric material filling first element hole 141A or can be an air gap. It should be understood that although only the first antenna segment 111C of the crossed zig-zag antenna segment pair 106C and a first element hole 141A of conductive disk 103C is shown, the same insulating structures and techniques are utilized for the second antenna segment 112C and other conductive disks 103A-B, D-F and element holes 141B, 142A-B, and 143A-B.

Figure 3A:
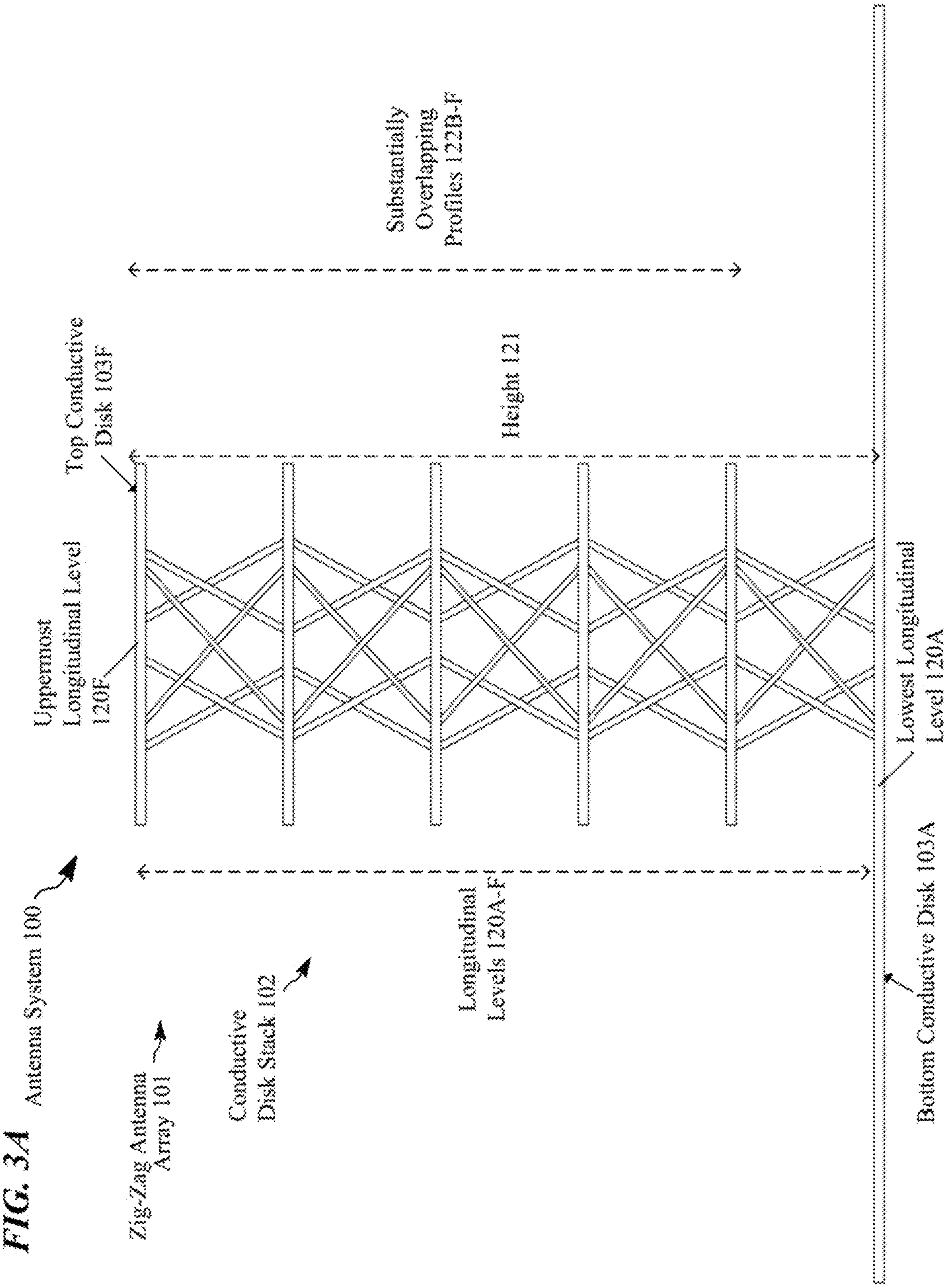
FIG. 3A is a side view of the zig-zag antenna array of FIGS. 1A-B and shows additional details of respective crossed zig-zag antenna segment pairs of the three crossed zig-zag antennas at varying longitudinal levels of the conductive disk stack.

FIG. 3A is a side view of the zig-zag antenna array 101 of FIGS. 1A-B and shows additional details of respective crossed zig-zag antenna segment pairs 106A-E of the three crossed zig-zag antennas 104A-C at varying (e.g., six) longitudinal levels 120A-F of the conductive disk stack 102. As shown, each of the conductive disks 103A-F is positioned at a varying longitudinal level 120A-F along a height 121 of the zig-zag antenna array 101. The conductive disk stack 102 of conductive disks 103A-F includes a bottom conductive disk 103A at a lowest longitudinal level 120A for an electrical connection to the control circuit 550. The conductive disk stack 102 includes a top conductive disk 103F at an uppermost longitudinal level 120F for an electrical termination of the three element pairs 105A-C.

Each of the conductive disks 103A-F or a subset 103B-F are aligned to have substantially overlapping profiles 122B-F of the respective disk lateral surface area 151B-F or the respective disk perimeter 152B-F along the height 121 of the zig-zag antenna array 101. "Substantially overlapping profiles" means from a side view the lateral surface areas 151B-F of the conductive disks 103B-F are longitudinally aligned to overlap between 90-100 percent. Hence, as shown five conductive disks 103B-F, including the top conductive disk 103F have substantially overlapping profiles 122B-F with each other. But the bottom conductive disk 103A is not substantially overlapping with any of the other conductive disks 103B-F.

Figure 3B:
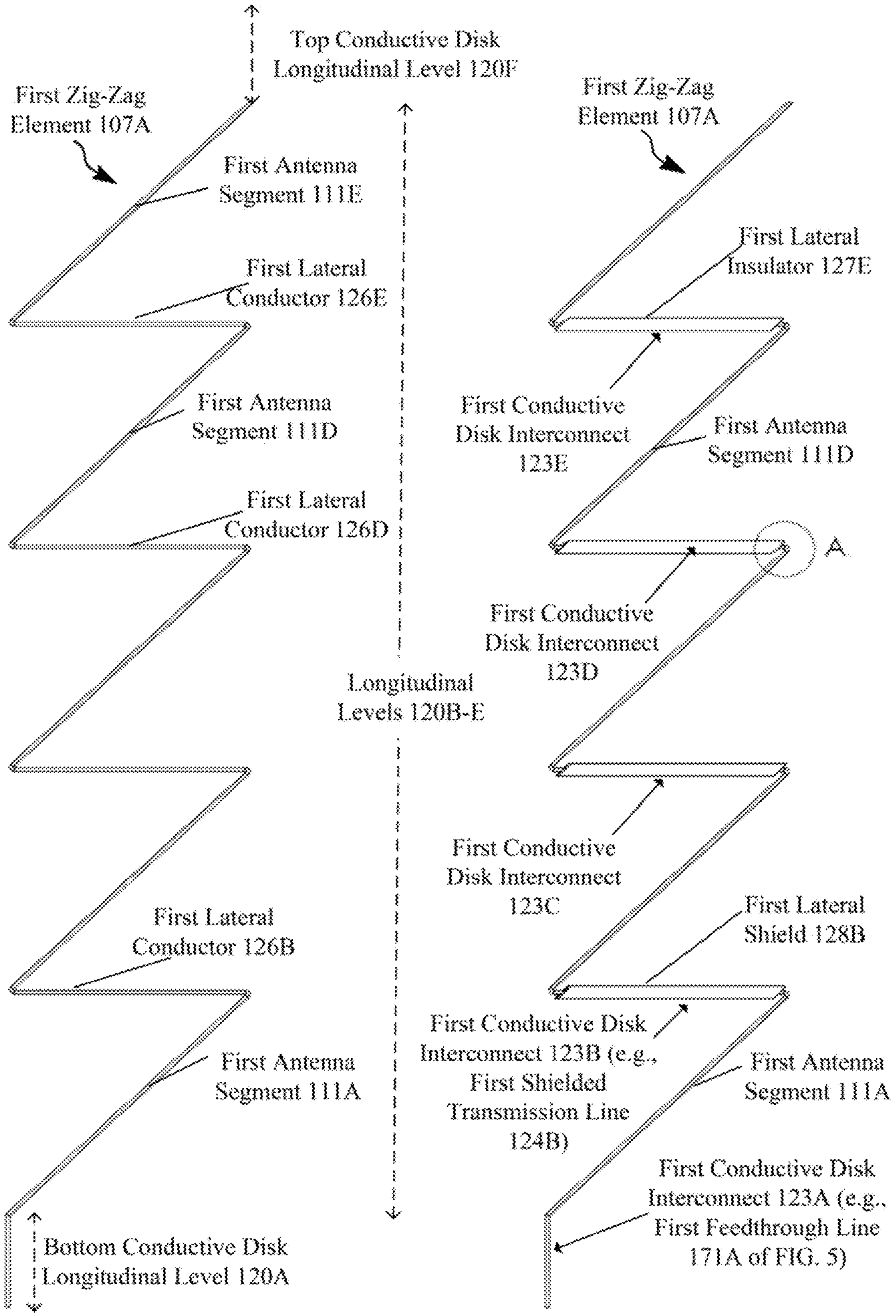
FIG. 3B is a side view of a first zig-zag element of a single crossed zig-zag antenna of FIGS. 1A-B and shows additional details of the first antenna segments and first conductive disk interconnects that include a first shielded transmission line.

FIG. 3B is a side view of a first zig-zag element 107A of a single crossed zig-zag antenna 104A of FIGS. 1A-B and shows additional details of the first antenna segments 111A-E and first conductive disk interconnects 123B-E (four) that include a first shielded transmission line 124B-E (four). Such an implementation of the first zig-zag element 107A can achieve elliptical polarization of RF waves. The shielded transmission lines 124B-E can take, for example, the form of a coaxial line, a microstrip line, a strip line, or a combination thereof. The first antenna segments 111A-E (five) are positioned between the bottom conductive disk longitudinal level 120A of the bottom conductive disk 103A and the top conductive disk longitudinal level 120F of the top conductive disk 103F. The first conductive interconnect 123A that passes (e.g., perpendicularly) through first conductive disk 103A includes a first feedthrough line 171A like that shown in FIG. 5D. However, as shown, each of the other first conductive interconnects 123B-E includes a respective first shielded transmission line 124B-E. Each first shielded transmission line 124B-E includes a respective first lateral conductor 126B-E surrounded by a respective first lateral insulator 127B-E, which are surrounded by a first lateral shield 128B-E. The first lateral shield 128B-E prevent contact between the monopole and the conductive disks 103B-E. The respective first lateral insulator 127B-E (not shown) and the first lateral shield 128B-E are shown in further detail in FIG. 4A. The first shielded transmission lines 124B-E pass through lateral openings or passages (e.g., tunnels) formed in respective conductive disks 103B-E.

Figure 4A:
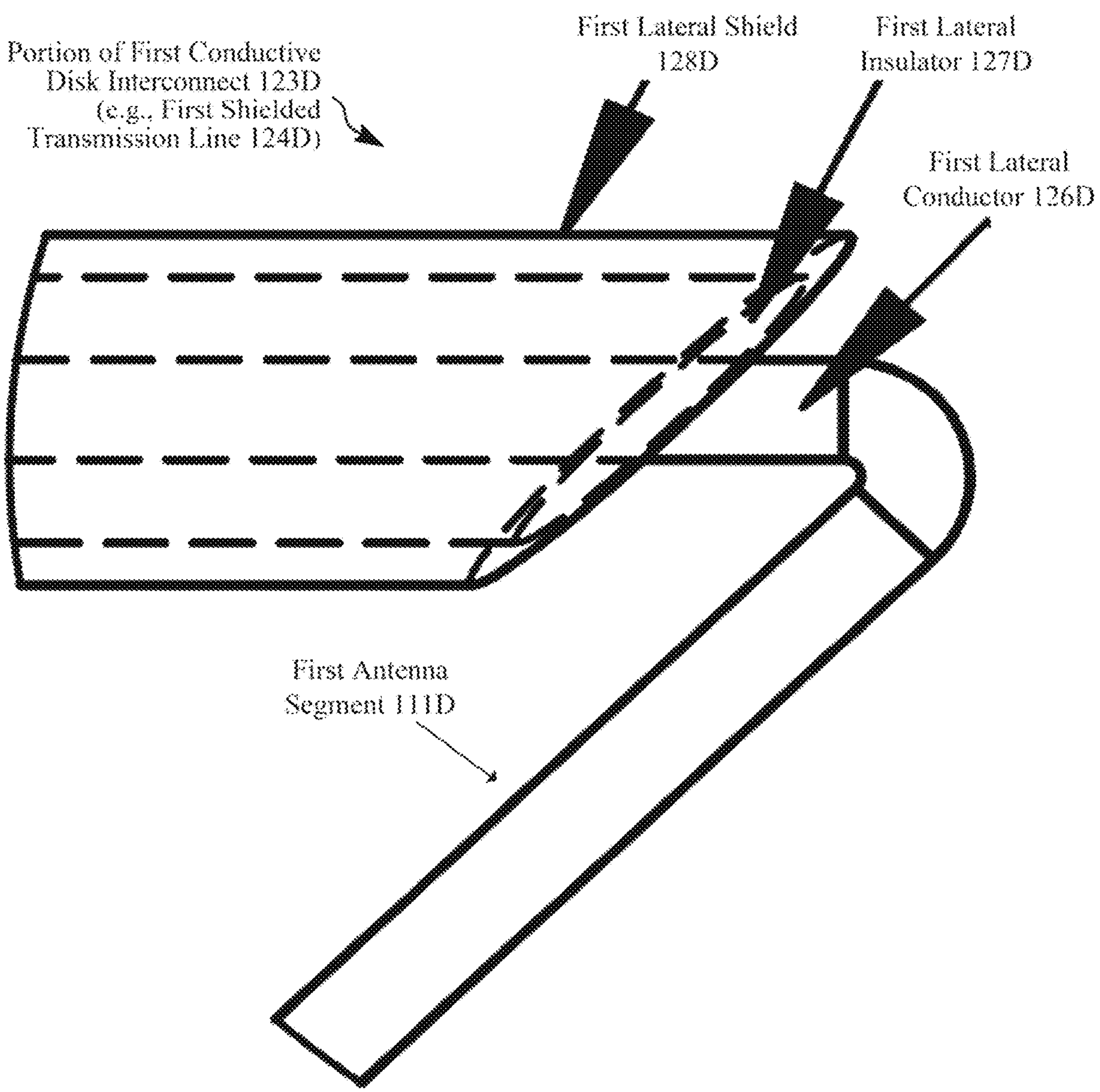
FIG. 4A is a zoomed in view of the encircled detail area A of FIG. 3B and shows additional details of the first shielded transmission line.

FIG. 4A is a zoomed in view of the encircled detail area A of FIG. 3B and shows additional details of the first shielded transmission line 124D. As shown, a portion of the first conductive disk interconnect 123D, includes the first shielded transmission line 124D. The first shielded transmission line 124D includes a first lateral conductor 126D surrounded by (e.g., wrapped in) a respective first lateral insulator 127D, which are surrounded by a first lateral shield 128D. The first lateral conductor 126D is approximately 45 degrees to the first antenna segment 111D. It should be understood that each of the first shielded transmission lines 124A-C and 124E-F are formed like the first shielded transmission line 124D shown in FIG. 4A. Moreover, each of the second shielded transmission lines 134A-E described below are formed in the same manner as the first shielded transmission line 124D shown in FIG. 4A.

Figure 4B:
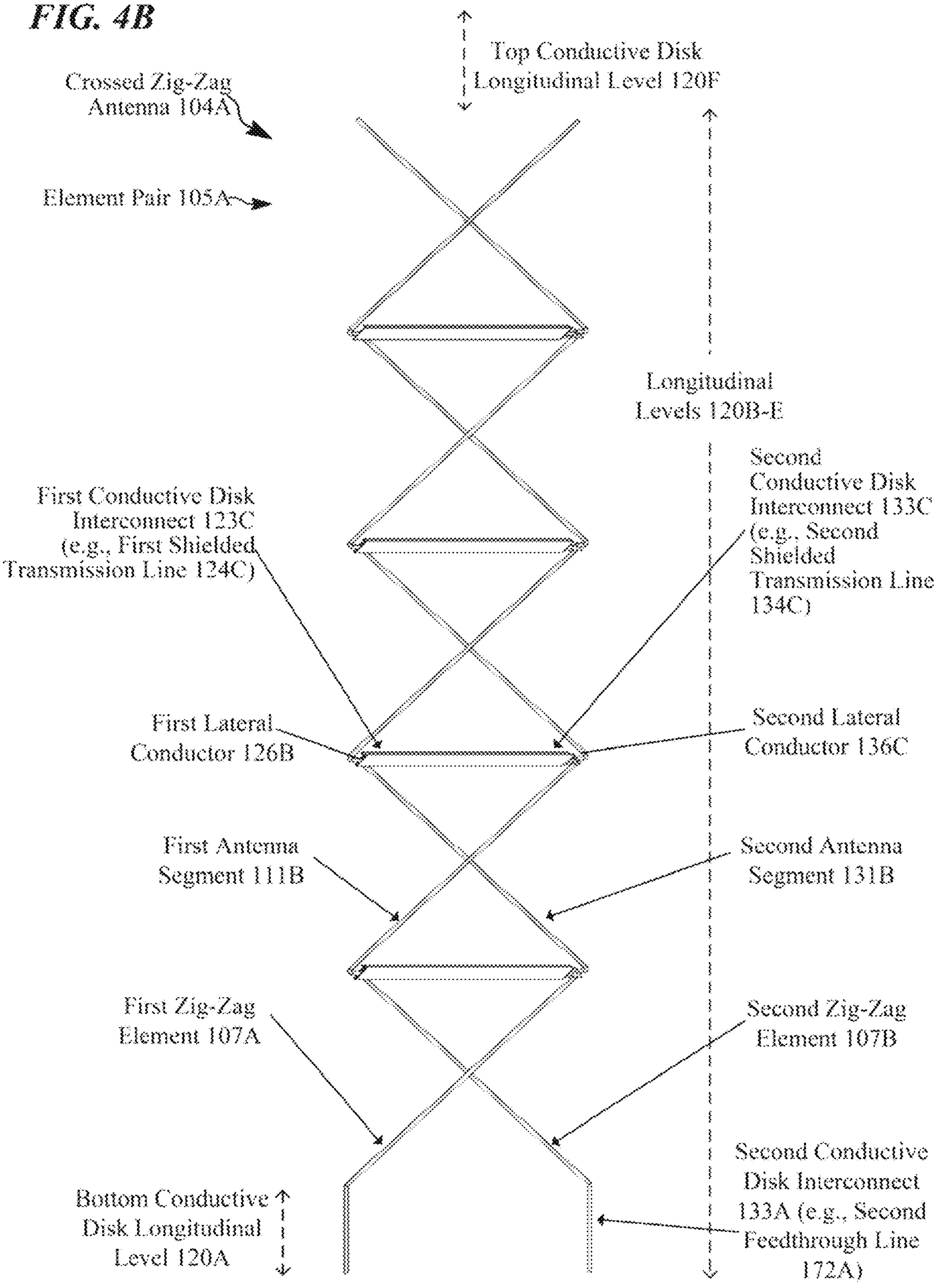
FIG. 4B is a side view of an element pair including a first zig-zag element and a second zig-zag element like that shown in FIGS. 3B and 4A of a single crossed zig-zag antenna of FIGS. 1A-B.
Figure 4C:
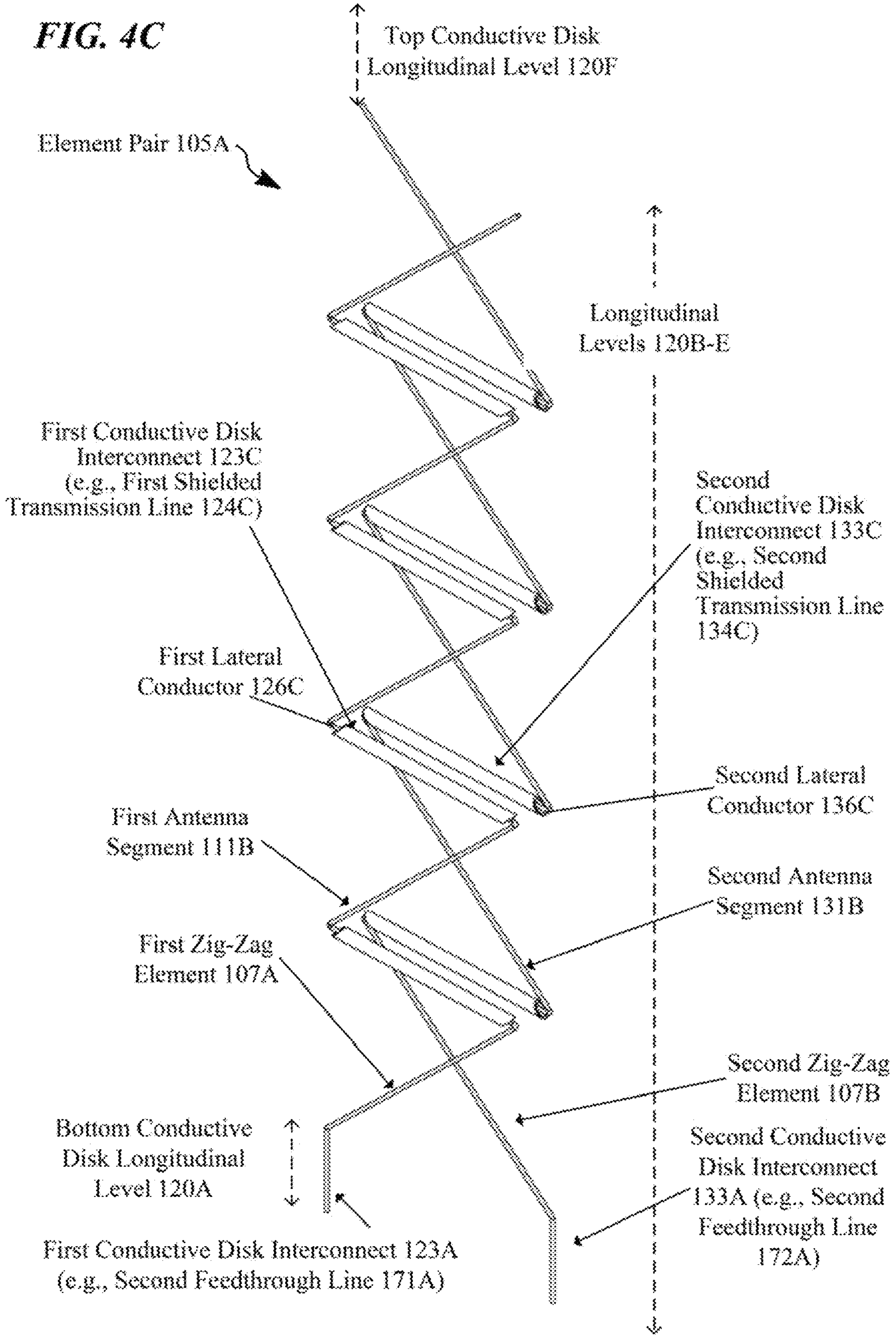
FIG. 4C is an isometric side view of the element pair of FIG. 4B.

FIG. 4B is a side view of an element pair 105A including a first zig-zag element 107A and a second zig-zag element 107A like that shown in FIGS. 3B and 4A of a single crossed zig-zag antenna 104A of FIGS. 1A-B. FIG. 4C is an isometric side view of the element pair 105A of FIG. 4B.

As shown in FIGS. 4B-C, the zig-zag antenna 104A of zig-zag antenna array 101 includes a first element 107A. The first element 107A includes a plurality of first conductive disk interconnects 123A-E to electrically connect the first antenna segments 111A-E with each other and a plurality of second conductive disk interconnects 133A-E to electrically connect the second antenna segments 112A-E with each other. The second zig-zag element 107B is a mirror image of the first zig-zag element 107A. The second conductive interconnect 133A that passes through first conductive disk 103A includes a second feedthrough line 172A like that shown in FIG. 5D. Hence, the second antenna segments 112A-E (five) of the second zig-zag element 107A are positioned between the bottom conductive disk longitudinal level 120A of the bottom conductive disk 103A and the top conductive disk longitudinal level 120F of the top conductive disk 103F. As shown, each second conductive interconnect 133B-E includes a respective second shielded transmission line 134B-E.

The first antenna segments 111A-E of the first zig-zag element 107A are oriented substantially parallel with respect to each other (e.g., same orientation) and are excited to obtain full polarization control along the entire height 121 of the crossed zig-zag antenna 104A. The substantially parallel orientation can be utilized to achieve crossed polarization. As shown, first antenna segments 111A-E are positioned approximately 45 degrees to first feedthrough line 171A and respective first shielded transmission lines 124B-E, which creates zig-zag structures of the first zig-zag element 107A. In the example of FIGS. 4A-C, the first conductive interconnect 123A that passes through first conductive disk 103A includes a first feedthrough line 171A like that shown in FIGS. 5A and 5D. A first subset of the first conductive disk interconnects 123B-E (e.g., between, but not including the bottom conductive disk 103A and the top conductive disk 103F) include a respective first shielded transmission line 124B-E in a respective conductive disk 103B-E that extends substantially laterally across the respective conductive disk 103B-E to electrically connect the first antenna segments 111A-E together. Alternatively, each of the first conductive disk interconnects 123A-E can include a respective first shielded transmission line 124A-E in a respective conductive disk 103A-E that extends substantially laterally across the respective conductive disk 103A-E to electrically connect the first antenna segments 111A-E together.

The second antenna segments 112A-E of the second zig-zag element 107B are oriented substantially parallel with respect to each other. As shown, respective second antenna segments 112A-E are positioned approximately 45 degrees to second feedthrough line 172A and respective second shielded transmission lines 134B-E, which creates zig-zag structures of the second zig-zag element 107B. In the example of FIGS. 4A-C, the second conductive interconnect 133A that passes through first conductive disk 103A includes a second feedthrough line 172A like that shown in FIGS. 5A and 5D. A second subset of the second conductive disk interconnects 133B-E (e.g., between, but not including the bottom conductive disk 103A and the top conductive disk 103F) include a respective second shielded transmission line 134B-E in each of the conductive disks 103B-E that extends substantially laterally across the respective conductive disk 103B-E to electrically connect the second antenna segments 112A-E together. Alternatively, each of the second conductive disk interconnects 133A-E can include a respective second shielded transmission line 134A-E in each of the conductive disks 103A-E that extends substantially laterally across the respective conductive disk 103A-E to electrically connect the second antenna segments 112A-E together.

In the implementation of FIGS. 4B-C, the first zig-zag element 107A and the second zig-zag element 107B are independently controllable as separate channels by the control circuit 550 to transmit or receive respective RF waves as a respective independent RF output beam with a different respective polarization state.

Figure 4D:
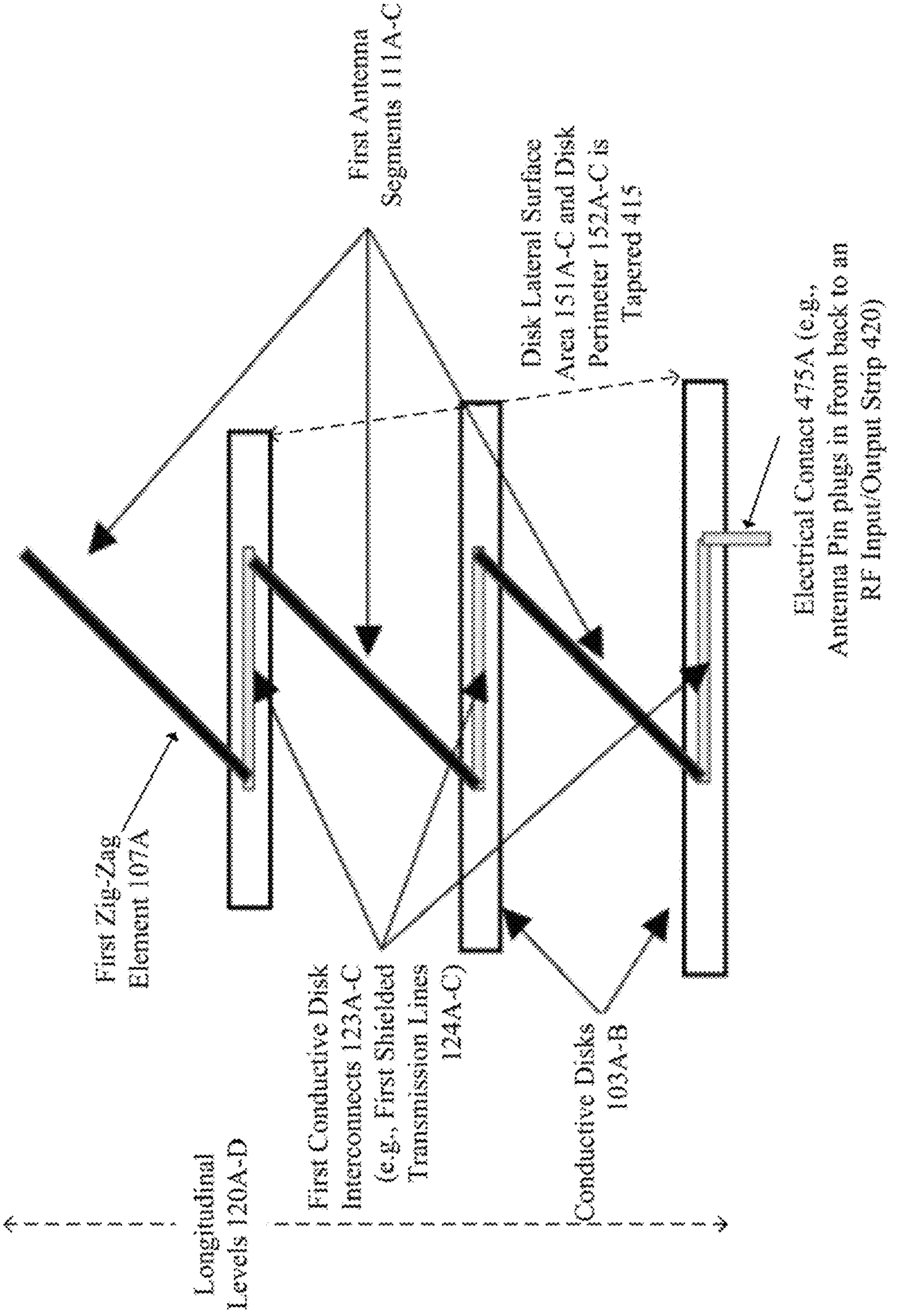
FIG. 4D is a side view of the first zig-zag element of FIGS. 4A-C showing first shielded transmission lines extending laterally across the conductive disks of the crossed zig-zag antenna and the first antenna segments extending diagonally from the conductive disks.
Figure 4E:
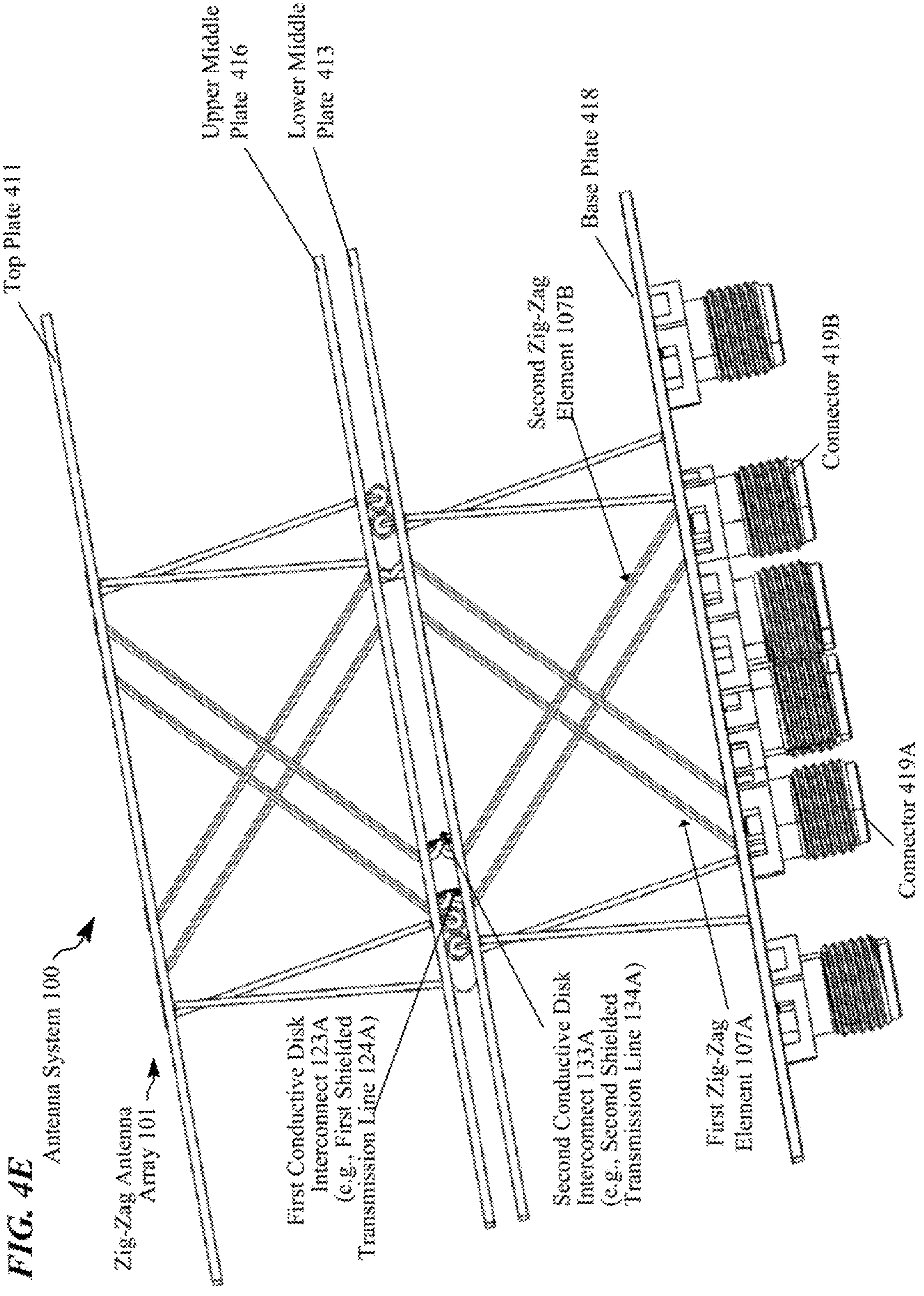
FIGS. 4E-H depict a two layer model of the antenna system and shielded transmission lines.
Figure 4F:
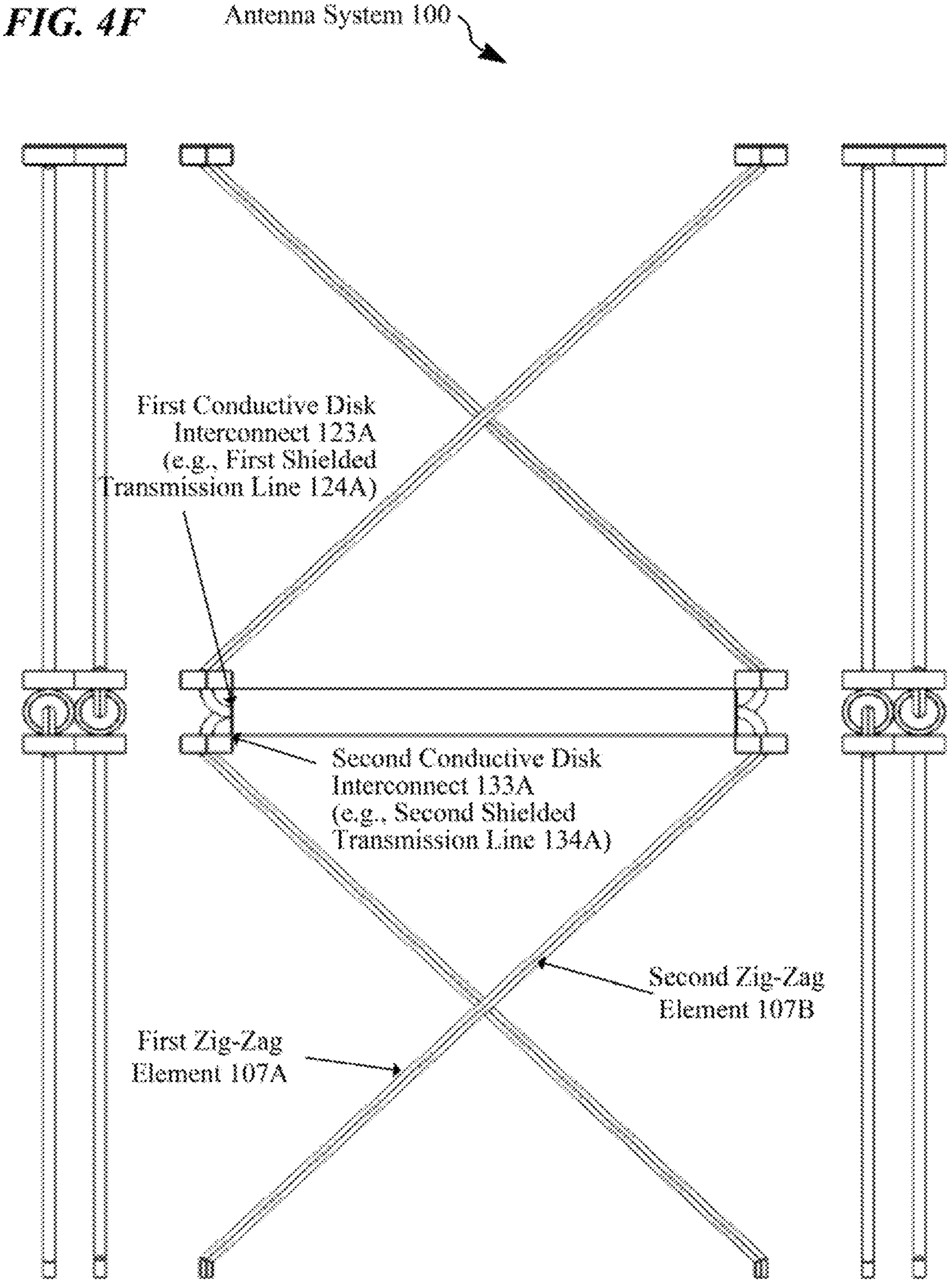
Figure 4G:
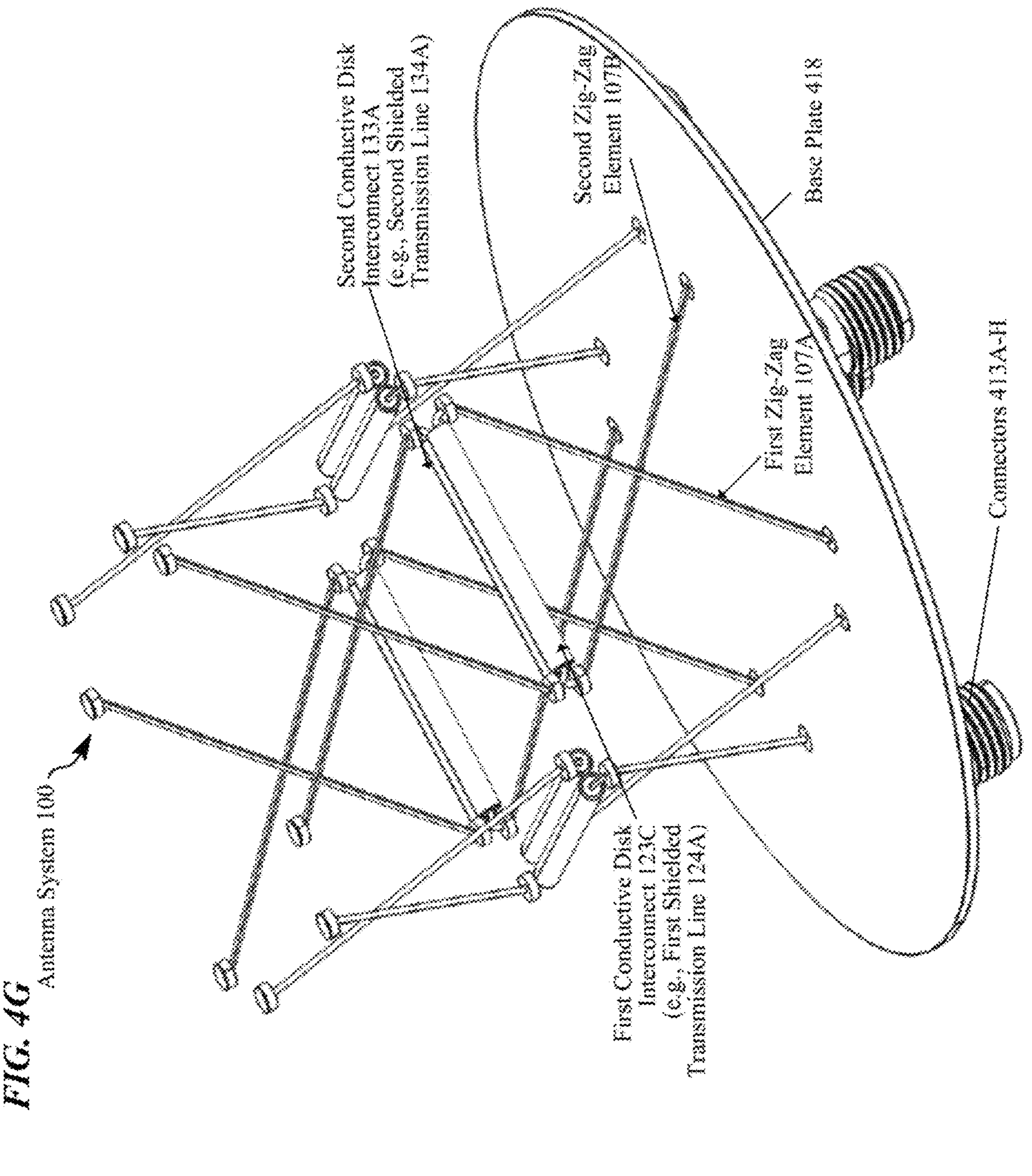
Figure 4H:
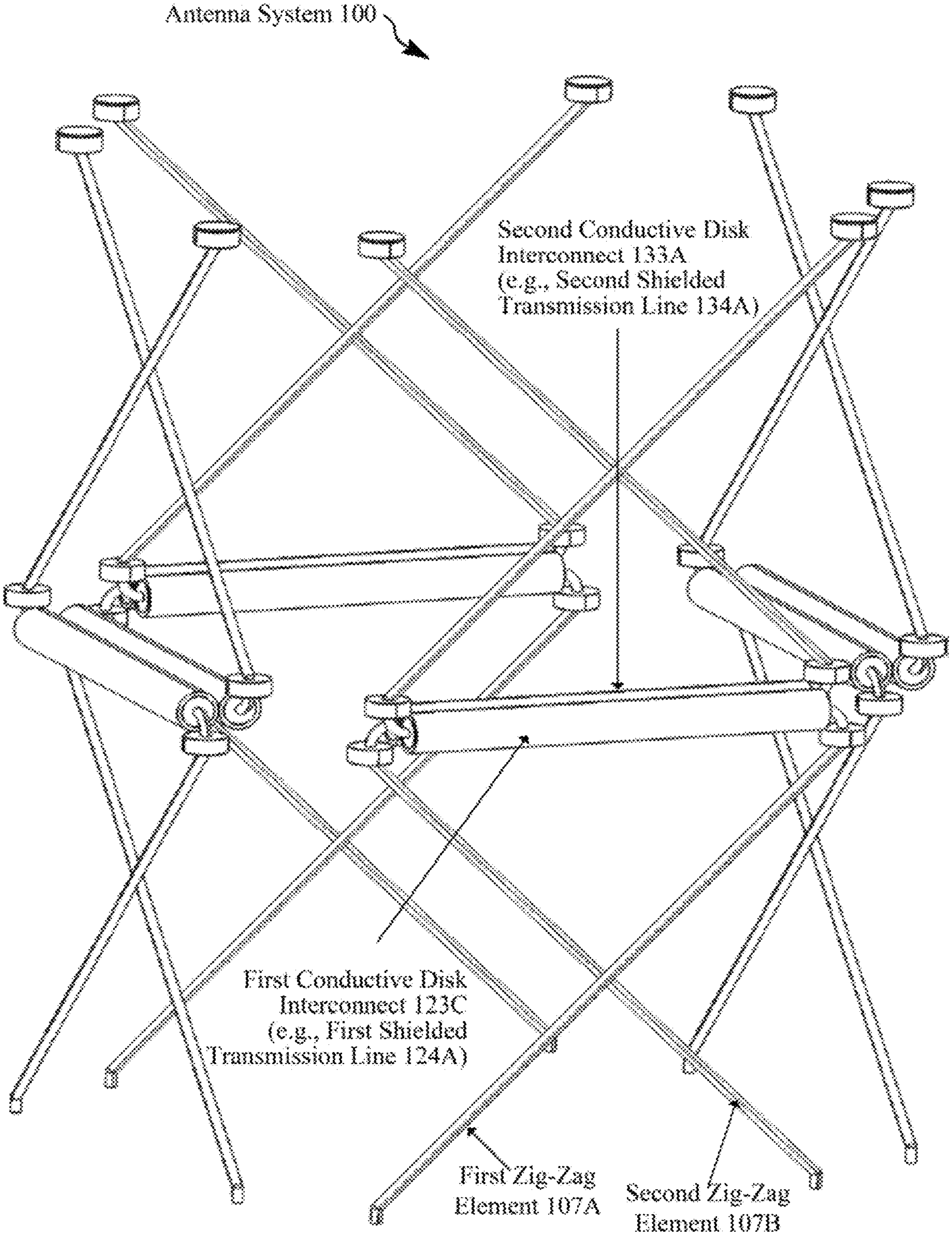

FIG. 4D is a side view of the first zig-zag element 107A of FIGS. 4A-C showing first shielded transmission lines 124A-C extending laterally across the conductive disks 103A-B of the crossed zig-zag antenna 104A and the first antenna segments 111A-C extending diagonally (approximately 45 degrees) from the conductive disks 103A-C. For clarity, only three first antenna segments 111A-C are depicted. Because of their common (e.g., substantially parallel orientation) enabled by the first shielded transmission lines 124A-C, the first antenna segments 111A-C can radiate in only a single polarization direction, which maintains polarization and unlocks MIMO applications. For example, this allows reception and transmission of both left and right circular polarized RF waves and keeping the RF signals independent (separate).

As shown, first antenna segments 111A-C are approximately 45 degrees to a lateral axis (e.g., horizontal axis) of the conductive disks 103A-F. As shown in FIG. 4A-D, respective first antenna segments 111A-E and respective second antenna segments 112A-E that form respective crossed zig-zag antenna segment pairs 106A-E are sensitive to only one orthogonal polarization component along the length of the zig-zag antenna 104A-C. This is accomplished by connecting adjacent respective first antenna segments 111A-E with each other and connecting respective second antenna segments 112A-E with each other by a length of a non-antenna shielded transmission line 124B-E and 134B-E, respectively, along or within the conductive disks 103B-E, to separate the first antenna segments 111A-E and the second antenna segments 112A-E. The first antenna segments 111A-E and the second antenna segments 112A-E are each λ/2 sections. This implementation is suitable for multiple-input multiple-output (MIMO) type operations where separate data streams are sometimes encoded on orthogonal polarizations. In addition to providing sensitivity to orthogonal linearly polarized signals, by adding a 90° phase shift between elements in crossed zig-zag antenna segment pairs 106A-E either right hand or left hand circular polarized signals can be received or transmitted.

Shielded transmission lines 124A-E and 134A-E can be non-radiating elements (waveguides) that are of a sufficient length and geometry to adjust phase of the RF signal. The shielded transmission lines 124A-E and 134A-E allows RF waves to continue with the same as previous layer (e.g., first antenna segments 111A-C) of first zig-zag element 107A, shown in FIGS. 3B, 4C-D. The two ends of the monopole enables synchronize of the radiation of the monopole in the different layers. Phase control of the RF signal can be achieved with various techniques, such as the length of shielded transmission lines 124A-E and 134A-E or adding electronics to tune phase shift.

In FIGS. 4A-B, the bottom conductive disk 103A has longitudinal openings or passages for the first conductive disk interconnect 123A and a second conductive disk interconnect 133A, which are the first feedthrough line 171A and the second feedthrough line 172A. However, in FIG. 4D, it can be seen that the conductive disk 103A actually includes lateral opening or passages for a first shielded transmission line 124A and a second shielded transmission line 134A. The first shielded transmission line 124A electrically connects to a respective electrical connect 475A, for example, a respective antenna pin that plus in from the back to a radio frequency (RF) input/output (I/O) strip 420. Although not shown, the second shielded transmission line 134A similarly electrically connects to a respective electrical contact 475B, for example, a respective antenna pin that plus in from the back to the RF I/O strip 420. Alternatively or additionally, the conductive disk interconnects 123A-F and second conductive disk interconnects 133A-F may further include a coaxial cable, a microstrip, a waveguide, or a combination thereof.

As further shown in FIG. 4D, the respective disk lateral surface area 151A-C or the respective disk perimeter 152A-C of a subset of conductive disks 103A-C is tapered 415 between the bottom conductive disk 103A and the top conductive disk 103C. For example, the respective disk lateral surface area 151A or the respective disk perimeter 152A of the lower conductive disk 103A is largest and the respective disk lateral surface area 165C or the respective disk perimeter 152C of the upper conductive disk 103C is smallest. Alternatively, the respective disk lateral surface area 151A-F or the respective disk perimeter 152A-F of each of the conductive disks 103A-F is tapered 415 between the bottom conductive disk 103A and the top conductive disk 103F. For example, the respective disk lateral surface area 151A or the respective disk perimeter 152A of the bottom conductive disk 103A is largest and the respective disk lateral surface area 152F or the respective disk perimeter 152F of the top conductive disk 103F is smallest.

When the zig-zag antenna array 101 is incorporated with a spherical reflector, the tapered 415 pattern improves RF wave reception and transmission by improving coupling to the signal of the spherical reflector. With the spherical reflector positioned above the top conductive disk 103F, the incoming RF waves typically come in from below the bottom conducting disk and go up past the zig-zag antenna array 101 and strike the spherical reflector and come back down to the focal line feed. Tapering can be used to optimize the illumination of the line feed on the spherical reflector. Typically, the greater the length 120 of the zig-zag antenna array 101, the more tapering is needed. Forming the bottom conductive disk 103A with a greater disk lateral surface area 151A and top conductive disk 103F with a smaller disk lateral surface area 151F and then gradually decreasing the disk lateral surface areas 151B-E between the bottom conductive disk 103A and the top conductive disk 103F, can help ensure that RF signals optimally illuminate the spherical reflector. However, if the zig-zag antenna array 101 is deployed in a standalone configuration, tapering typically will not improve performance.

FIGS. 4E-H depict a two layer model of the antenna system 100 and shielded transmission lines 124, 134A (e.g., coaxial cables) in between plates of the zig-zag antenna array 101. Antenna system 100 includes a top plate 411 and a base plate 418. There are eight connectors 419A-H on the base plate 418 (e.g., one connector 419*x* for each of the eight depicted monopoles that are divided into four monopole pairs). Due to the angle of the view, not all of the connectors 419A-H are visible. Antenna system 100 includes eight shielded transmission lines 124A-D, 134A-D total (one per first and second monopole pair set). Antenna system 100 includes the first shielded transmission line 124A to maintain a first polarization state of RF waves of the first zig-zag element 107A element; and the second shielded transmission line 134A to maintain a second polarization state of the RF waves of the second zig-zag element 107B. Shielded transmission lines 124A, 134A are positioned between an upper middle plate 416 and a lower middle plate 413.

FIG. 5A is a block diagram of a geometric layout of the zig-zag antenna array 101 of the antenna system 100. The zig-zag antenna array 101 provides high sensitivity, broad areal coverage, and is capable of receiving and transmitting vertically, horizontally, and circularly polarized signals of wavelength (k). At the core of the antenna are one or more pairs of orthogonal, zig-zag structures (crossed zig-zag antenna segment pairs 106A-E) composed of thin (approximately $<\lambda/10$) conductors (first antenna segments 111A-E and second antenna segments 112A-E). Each of the first antenna segments 111A-E and the second antenna segments 112A-E has a length of approximately $\lambda/2$ and is separated by thin conductive disks 103A-F with a diameter of approximately 0.85λ. The electromagnetic response of each of the first antenna segments 111A-E and the second antenna segments 112A-E is that of an approximately $\lambda/2$ monopole rotated approximately 45° to a longitudinal axis (e.g., vertical axis) of the zig-zag antenna 101 that is orthogonal to the conductive disks 103A-F. The length of the first antenna segments 111A-E and the second antenna segments 112A-E produces nulls in the response pattern at the location of each conductive disk 103A-F. The conductive disks 103A-F serve to isolate the electromagnetic field response of each crossed zig-zag antenna segment pairs 106A-E formed by the respective first antenna segment 111A-E and the second antenna segment 112A-E, thereby yielding a largely broadside, radial response. The length of each monopole can be lengthened or shortened from the nominal length of approximately $\lambda/2$, if an appropriate phase shift is added at the top or bottom of the monopole to compensate.

The bottom conductive disk 103F can be larger than the others and serve as a ground plane. The two conductive paths of each of the first antenna segments 111A-E and the second antenna segments 112A-E are continuous and can pass through the conductive disks 103A-F by way of conductive disk interconnects 123A-E, 133A-E (e.g., the depicted feedthrough lines 171A-E, 172A-E in FIG. 5A and/or shielded transmission lines 123A-E, 133A-E shown in FIG. 4C). The orthogonal geometry of the crossed zig-zag antenna segment pairs 106A-E yields a structure sensitive to both horizontally and vertically polarized signals.

The continuous, periodic nature of the first antenna segments 111A-E and the second antenna segments 112A-E cause any signals with a wavelength, λ, intercepted along its length, L, to constructively interfere and appear as a sum at antenna terminals of each zig-zag antenna 104A-C. Therefore, the power received by each zig-zag antenna 104A-C, $P_R$, increases with L until such point where the losses associated with traveling the distance L+ΔL are greater than the energy intercepted over ΔL. Each zig-zag antenna 104A-C can be composed of two or more pairs of first antenna segments 111A-E and the second antenna segments 112A-E to form the crossed zig-zag antenna segment pairs 106A-E, which when properly phased relative to one another, can be used to generate and steer a wide variety of beam patterns. If desired, the diameters of the conductive disks 103A-F can be tapered as shown in along a length (e.g., height 121) of each zig-zag antenna 104A-C to provide focusing of the beam pattern upward from the base (i.e., at the bottom conductive disk 103A), for example, when used in conjunction with a spherical balloon reflector.

The geometric layout of the zig-zag antenna array 101, including the crossed zig-zag antenna 104A, shows a longitudinal disk spacing 515 between each of the conductive disks 103A-F that is approximately a wavelength (λ or lambda) of the RF waves multiplied by 0.354 (λ*0.354), which is derived from a wavelength of the RF waves divided by 2 times square root of two ($\lambda/2\sqrt{2}$). Normally, one would expect the longitudinal disk spacing 515 to be half a wavelength. But because the first antenna segments 111A-E and second antenna pairs 112A-E that formed crossed zig-zag antenna pairs 106A-E are crossed, the longitudinal disk spacing 515 is optimized based on computer simulations to arrive at λ*0.354. This is a theoretical estimate and, in other practical examples, the longitudinal disk spacing 515 ranges between 0.25 to 0.75 multiplied by the wavelength (λ) of the RF waves. When the zig-zag antenna array 101 is utilized with a spherical balloon reflector, the longitudinal disk spacing 515 will affect the illumination pattern on the spherical balloon reflector. In such a spherical balloon reflector deployment, half a wavelength is just a starting point for the longitudinal disk spacing 515, which is further adjusted based on a size of the spherical balloon reflector. Moreover, when operating in a particular RF band, the longitudinal disk spacing 515 may be refined depending on the illumination pattern, frequency of operation, and bandwidth.

The overall geometric layout of the zig-zag antenna array 101 thus depicts a segment thickness of each of the first antenna segments 111A-E and the second antenna segments 112A-E is approximately the wavelength of the RF waves divided by ten (λ/10) or less. A segment length of each of the first antenna segments 111A-E and the second antenna segments 112A-E is approximately the wavelength of the RF waves divided by two (λ/2). A lateral element hole spacing 510 between the respective first element 141A hole and the respective second element hole 141B (shown in FIG. 2A) is approximately a wavelength of the RF waves multiplied by 0.354 (λ*0.354).

For the substantially parallel orientation of monopoles (e.g., first antenna segments 111A-E of first zig-zag element 107A) like that shown in FIGS. 3B and 4C-D, one pair of monopoles can be incorporated into a plane and two different sides of a control circuit board 600 (see FIGS. 6A-B) and then have one same board the shielded transmission line. You can have traces or strip of shielding from coax cable instead of shielded transmission lines.

FIG. 5B depicts the geometric layout of the top conductive disk 103A. As shown, a top disk diameter 525 of the top conductive disk 103F is approximately the wavelength of the RF waves multiplied by 0.85 (λ*0.85). FIG. 5C depicts the geometric layout of the bottom conductive disk 103A. As shown, a bottom disk diameter 530 of the bottom conductive disk 103A is approximately a wavelength of the RF waves multiplied by three (λ*3). In FIGS. 5B-C, the acronym DP in DP #1, DP #2, and DP #3 stands for dual polarization.

FIG. 5D is a zoomed in view of the encircled detail area of FIG. 5A and shows additional details of a second feedthrough line 172E type of a second conductive disk interconnect 133E. As shown, the second feedthrough line 172E includes a second longitudinal conductor 526E surrounded by a first longitudinal insulator 527E. The longitudinal insulator 527E is a dielectric material. As shown in the example, the second feedthrough line 172E is not shielded; therefore, when a conductive disk 103A-E is crossed there is no shielding to prevent contact between the crossed monopoles passing through and the conductive disks 103A-E. Because of their substantially orthogonal orientation by utilization of the second feedthrough line 172E, both the second antenna segments 112D and 112E radiate in dual polarization (DP) directions (two). For example, this allows reception and transmission of both left and right circular polarized RF waves, but can make it more difficult to keep the RF signals independent (separate) than the parallel orientations shown in FIG. 3B. For example, with the construction of FIG. 5D, the first zig-zag element 107A and the second zig-zag element 107B of the element pair 105A are controlled as a shared channel by the control circuit 550 to transmit or receive the RF waves as a shared RF output beam with a common polarization state.

It should be understood that each of the second feedthrough lines 172A-D are formed like the second feedthrough line 172E shown in FIG. 5. Moreover, each of the first conductive disk interconnects 123A-E include first feedthrough lines 171A-E (e.g., coaxial cable feedthrough lines) and are formed in the same manner as the second feedthrough line 172E shown in FIG. 5D. Typically, an impedance of the first feedthrough lines 171A-E and second feedthrough lines 172A-E is given by the coaxial line impedance formula: approximately twenty multiplied by the natural log (20*ln) of the ratio of the inner to outer conductor of the longitudinal conductor 526E. To enable maximum transfer of the RF waves, the impedance of the first feedthrough lines 171A-E and second feedthrough lines 172A-E approximately matches the impedance of the crossed zig-zag antenna 104A. In other words, the impedance of the first feedthrough lines 171A-E and second feedthrough lines 172A-E matches the crossed zig-zag antenna 104A being excited. Usually, the impedance is around 100 Ohms, but the impedance may vary.

With a construction like that shown in FIG. 5A, the first antenna segments 111A-E of the first zig-zag element 107A are oriented substantially orthogonal with respect to each other. A first subset of the first conductive disk interconnects 123B-E (e.g., between, but not including the bottom conductive disk 103A and the top conductive disk 103F) include a respective first feedthrough line 171B-E in a respective conductive disk 103B-E that extends substantially longitudinally across a respective conductive disk 103B-E to electrically connect the first antenna segments 111A-E together. Alternatively, each of the first conductive disk interconnects 123A-E (e.g., not including the top conductive disk 103F) include a respective first feedthrough line 171A-E in a respective conductive disk 103A-E that extends substantially longitudinally across the respective conductive disk 103A-E to electrically connect the first antenna segments 111A-E together. This configuration serves to isolate the RF signals being received or transmitted between orthogonal monopoles.

As further shown in FIGS. 5A and 5D, the second antenna segments 112A-E of the second zig-zag element 107B are oriented substantially orthogonal with respect to each other. A second subset of the second conductive disk interconnects 133B-E (e.g., between, but not including the bottom conductive disk 103A and the top conductive disk 103F) include a respective second feedthrough line 172B-E in a respective conductive disk 103B-E that extends substantially longitudinally across the respective conductive disk 103B-E to electrically connect the second antenna segments 112A-E together. Alternatively, each of the second conductive disk interconnects 133A-E (e.g., not including the top conductive disk 103F) include a respective second feedthrough line 172A-E in a respective conductive disk 103A-E that extends substantially longitudinally across the respective conductive disk 103A-E to electrically connect the second antenna segments 112A-E together.

FIG. 5E is a block diagram of the control circuit 550 of the antenna system 100, in which the control circuit 550 includes a microcontroller 555 and one or more radio(s) 560A-C. Control circuit 550 further includes six independently controlled outputs 571A-F that are coupled to the microcontroller 555. Each respective independently controlled output 571A-F is operated by the microcontroller 555 and coupled to a respective crossed zig-zag antenna 104A-C to transmit or receive respective RF waves via the respective antenna element pair 105A-C from a respective radio 560A-C. In the example, there are six independently controlled outputs 571A-F, grouped into three sets of independently controlled outputs 571A-B, 571C-D, and 571E-F. Respective sets of independently controlled outputs 571A-B, 571C-D, and 571E-F are coupled to respective sets of electrical contacts 475A-B, 475C-D, and 475E-F of a respective element pair 105A-C of a respective crossed zig-zag antenna 104A-C. Accordingly, the three sets of independently controlled outputs 571A-B, 571C-D, and 571E-F are operated by the microcontroller 555 and coupled to the respective element pair 105A-C to transmit or receive the RF waves via a respective first zig-zag element 107A-B, 108A-B, and 109A-B of the element pair 105A-C from the respective radio 560A-C.

When the first and second conductive interconnects 123*x*, 133*x* are formed of either: (i) a first and second shielded transmission line 124*x*, 134*x*, respectively, or (ii) a first and second feedthrough line 171*x*, 172*x*, respectively, then each crossed zig-zag antenna 104A-C is independently controllable as a separate channel (e.g., with a different single polarization) by the control circuit 550 through the respective element pair 105A-C to transmit or receive the RF waves as a respective independent RF output beam with a different respective polarization state. However, in the example shown in FIGS. 4A-D, when the first and second conductive interconnects 123*x*, 133*x* are formed of a first and second shielded transmission line 124*x*, 134*x*, respectively, then the respective first zig-zag element 107A, 108A, and 109A and the respective second zig-zag element 107B, 108B, and 109B are independently controllable as separate channels by the control circuit 550 to transmit or receive the respective RF waves as a respective independent RF output beam with a different respective polarization state. In the example shown in FIGS. 5A and 5D, when the first and second conductive interconnects 123*x*, 133*x* are formed of a first and second feedthrough line 171*x*, 172*x*, respectively, then the respective first zig-zag element 107A, 108A, and 109A and the respective second zig-zag element 107B, 108B, and 109B are controlled as a shared channel (e.g., with the same dual polarization) by the control circuit 550 to transmit or receive the respective RF waves as a shared RF output beam with a common polarization state.

Control circuit 500 further includes a power combiner 565 for coupling RF waves to radio I/O lines 661A-C (see FIGS. 6A-B) that combines or divides RF power. During reception, power combiner 565 combines RF wave signals; and during transmission, power combiner 565 divides (splits) RF wave signals between respective element pairs 105A-C of crossed zig-zag antennas 104A-C.

The control circuit 500 also includes a phase and amplitude control block 570 to handle to implement phase and amplitude control for the combined and divided RF wave signals. The phase and amplitude control 570 block individually controls amplitude and phasing of each crossed zig-zag antenna 104A-C and is controlled to switch between linear and circular polarization control, as well as implement control in the aggregate. Phase and amplitude control block 570 can include three adjustable phase shifters and attenuators, one for each element pair 105A-C. Since there are three crossed zig-zag antennas 104A-C in the zig-zag antenna array 101, resulting in three element pairs 105A-C, each element pair 105A-C has a respective phase shifter and attenuator to control that element pair 105A-C. For example, by adjusting phase of the first zig-zag element 107A to the second zig-zag element 107B, the polarization control of the RF waves (signals) can be changed from right to left polarization or from up to down polarization to excite different polarization states. Phase control is utilized to both excite a target polarization state and steer the RF beam. Amplitude control is utilized to reduce side lobe levels and provide greater control of the RF waves.

Figure 6A:
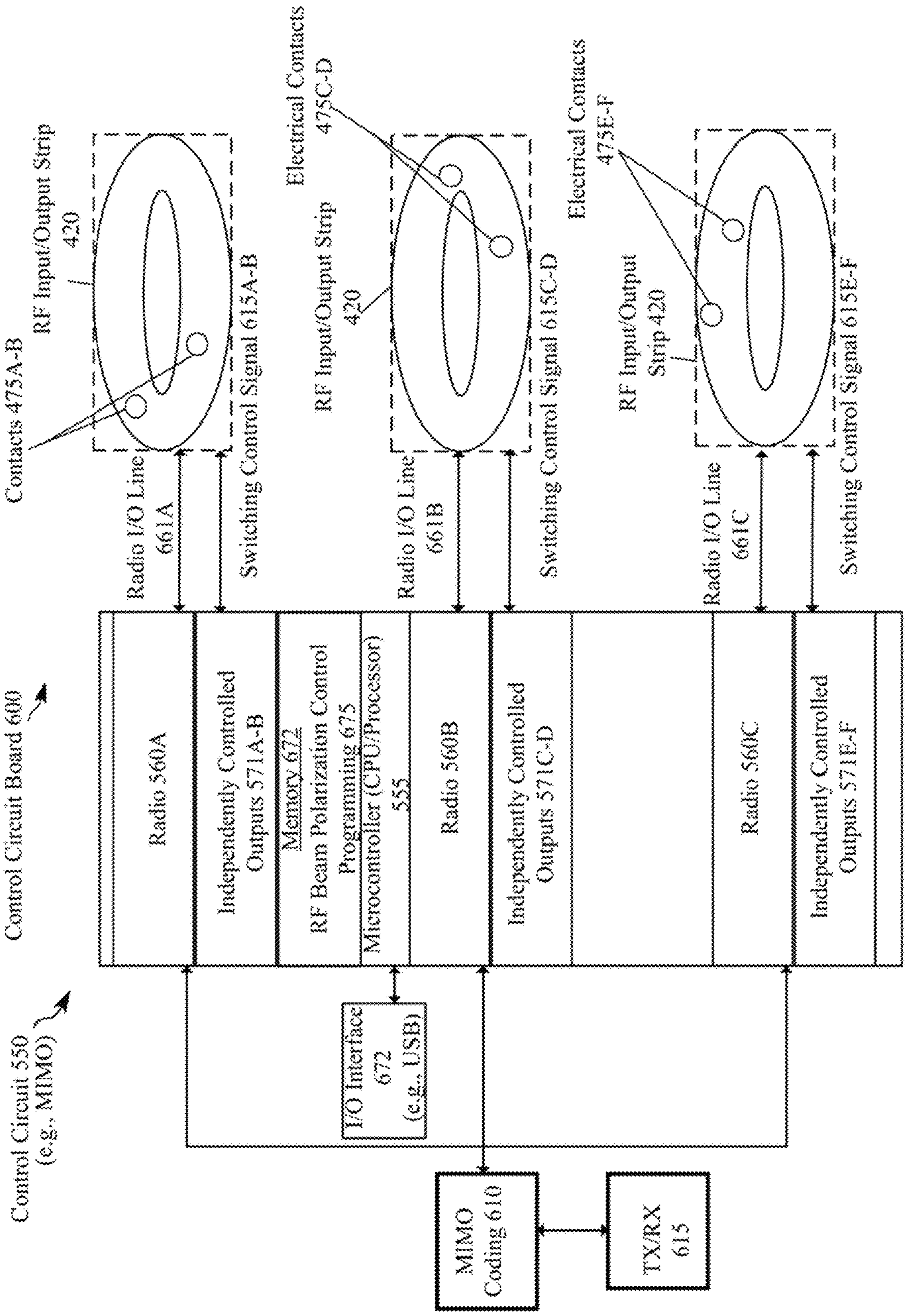
FIGS. 6A-B depicts block diagrams of two types of control circuits of the antenna system 100 like that shown in FIG. 5E that can implement a multiple-input and multiple-output (MIMO) architecture.
Figure 6B:
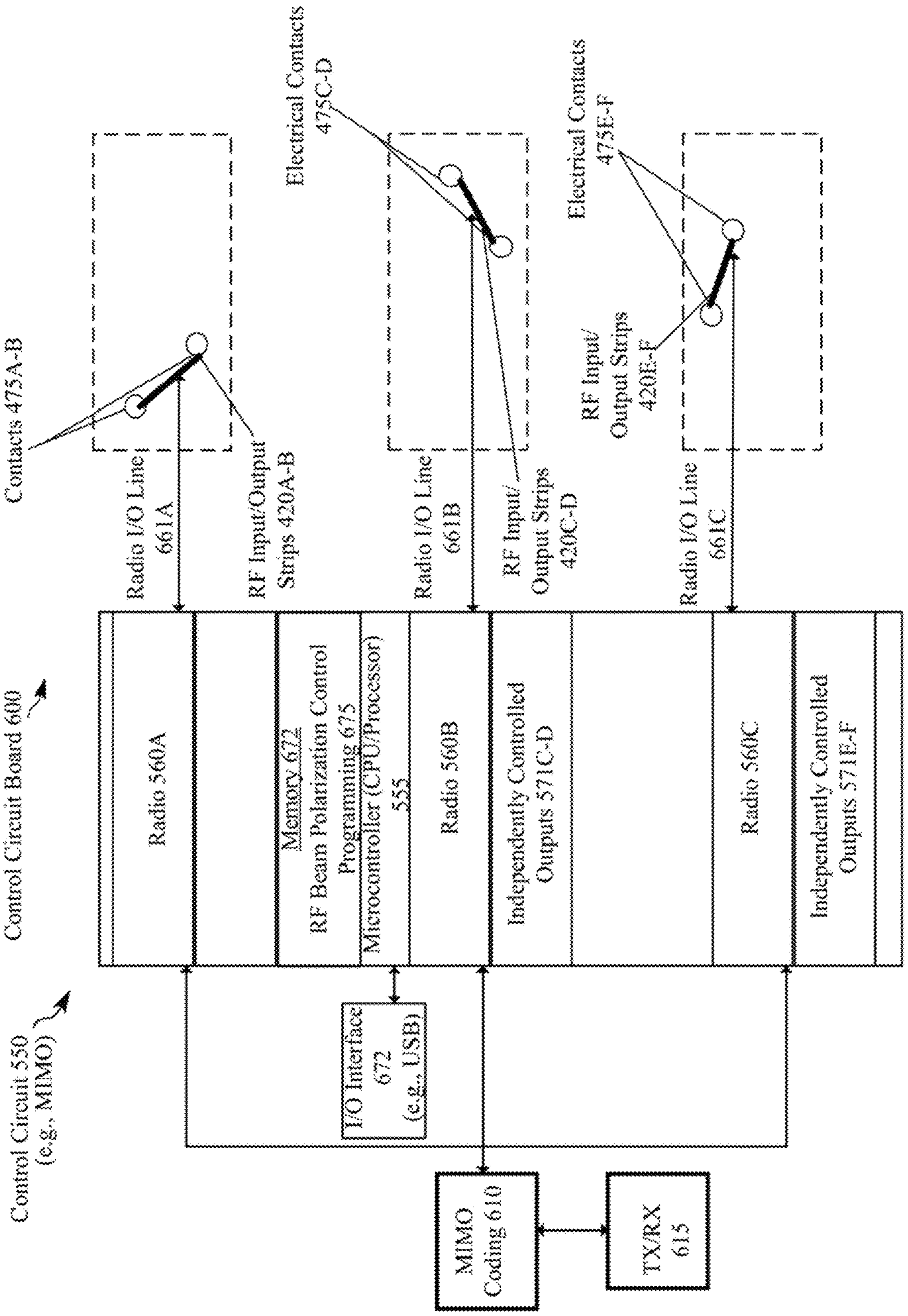

FIGS. 6A-B depict block diagrams of two types of control circuits 550 of the antenna system 100 like that shown in FIG. 5E. As shown, the control circuit 550 can implement a multiple-input and multiple-output (MIMO) architecture, which employs multiple RF channels. Control circuit 550 includes at least one control circuit board 600 and can include one or more radios 560A-N, of which three radios 560A-C are shown. The control circuit 550 allows any combination of crossed monopoles to be used on transmit or receive.

As further shown, control circuit 550 includes a MIMO coding block 610 and a transmission (TX) and reception (RX) block 615. MIMO coding block 610 can be based on 802.11 techniques. The MIMO coding block 610 can be programming that is controlled by the TX/RX block 615. MIMO is a technique for multiplying the capacity of one or more radio 560A-C links using multiple transmit and receive crossed zig-zag antennas 104A-C of the crossed zig-zag antenna 101 to exploit multipath propagation. For example, crossed zig-zag antennas 104A-C may transmit or receive in a range from 100 megahertz (MHz) to 40 gigahertz (GHz). The control circuit 550 includes the depicted circuit board 600 to allow the user (via the MIMO coding block 610) to set which radios 860A-C, modulation schemes, and crossed zig-zag antennas 104A-C should be activated to transmit and receive for this purpose. Microcontroller 555 can include a memory with programming instructions to control RF polarization states and power.

In the example of FIG. 6A, the control circuit board 600 includes a single RF input/output (I/O) strip 420 electrically connected to independently controlled outputs 571A-F. The RF input/output strip 420 is a single continuous conductive strip 420 that electrically connects all of the zig-zag elements 107A-B, 108A-B, and 109A-B to the three radio I/O line 661A-C, but the independently controlled outputs 571A-F arbitrates sharing of the RF input/output strip 420. The RF input/output strip 420 is a conductive microstrip arranged with a conductive shape pattern on the circuit board 600 that is approximately the shape of the zig-zag antenna array perimeter 210 (e.g., irregular hexagon shaped). Each independently controlled output 571A-F is configured to turn on or off based on a respective switching control signal, such as switching control 615A-F, from the microcontroller 555.

The independently controlled outputs 571A-F can be switches, relays, multiplexers, demultiplexers, or transistors, which can activate or deactivate the respective crossed zig-zag antenna 104A-C during transmission or reception of RF waves. In the example of FIG. 6A, the independently controlled outputs 571A-F are switches, more specifically PIN diodes arranged in an assembly with a shape pattern on the circuit board 600 that is approximately the shape of the zig-zag antenna array perimeter 210 (e.g., irregular hexagon shaped). With the assembly arranged with such a shape pattern on the circuit board 600, the independently controlled outputs 571A-F can align and electrically connect with the six electrical contacts 475A-F to electrically connect to respective zig-zag elements 107A-B, 108A-B, 109A-B in order to switch and drive the zig-zag elements 107A-B, 108A-B, 109A-B with RF waves of different polarization states. Based on the respective switching control signal 615A-F, each independently controlled output 571A-F is configured to control the respective element pair 105A-C of the respective crossed zig-zag antenna 104A-C to transmit or receive the RF waves via respective first and second zig-zag elements 107A-B, 108A-B, and 109A-B. In the example of FIG. 6A, the switching control signal 615A-F is a control voltage run on six lines to the independently controlled outputs 571A-F. In some examples, the control voltage may be applied to single line and gated to the independently controlled outputs 571A-F based on a timing signal.

The control circuit 550 further includes a plurality of electrical contacts 475A-F, such as antenna pins that plug in from the back. Each respective electrical contact 475A-F (six) is electrically connected to respective zig-zag elements 107A-B, 108A-B, 109A-B (six) and a respective independently controlled output 571A-F (six). For example, electrical contact 475A is electrically connected to the first zig-zag element 107A and independently controlled output 571A, electrical contact 475B is electrically connected to the second zig-zag element 107B and independently controlled output 571B, electrical contact 475C is electrically connected to the first zig-zag element 108A and independently controlled output 571C, electrical contact 475D is electrically connected to the second zig-zag element 108B and independently controlled output 571D, electrical contact 475E is electrically connected to the first zig-zag element 109A and independently controlled output 571E, and electrical contact 475F is electrically connected to the second zig-zag element 109B and independently controlled output 571F.

Microcontroller 555 is configured to turn on the respective independently controlled output 575A-F with the respective control signal, such as switching control signal 615A-F, which activates and closes the respective portion of the control circuit 550. Turning on of the respective independently controlled output 571A-F, electrically connects the RF input/output strip 420 to a respective element pair 105A-C which transmits RF radiation of different polarization states via the selected element pairs 105A-C by adjusting a phase difference between respective first and second zig-zag elements 107A-B, 108A-B, and 109A-B (e.g., transmission mode) and/or receives RF radiation via the selected element pair 105A-C (e.g., reception mode). Microcontroller 555 is configured turn off the respective independently controlled output 575A-F with the respective switching control signal 615A-F to electrically disconnect the RF input/output strip 420 from the respective element pair 105A-C, which deactivates and opens the respective portion of the control circuit 550.

As further shown, control circuit 550 further includes multiple (three) radios 560A-C configured to input an RF input signal to the RF input/output strip 420 during transmission mode. A respective radio input/output line is 661A-C is connected to each respective radio 560A-C. The circuit board 600 includes an RF input/output 420 strip connected to the radio input/output lines 661A-C to convey the RF waves to and from each respective radio 560A-C.

Radios 560A-C are configured to receive an RF output signal from the RF input/output strip 420 during reception mode. Microcontroller 555 is also coupled to RF beam polarization control programming 675. The RF beam polarization control programming 675 can be stored in a memory 672, which is accessible to the microcontroller 556. Programming instructions of the RF beam polarization control programming 675 are executable by the microcontroller 555. Microcontroller 556 can also be coupled to an input/output (I/O) interface 672, such as a Universal Serial Bus (USB) port in the example. Alternatively or additionally, the RF beam polarization control programming 675 can be received via the input/output interface 672. The RF beam polarization control programming 675 can select the location and number of crossed zig-zag antennas 104A-C and phase differences of respective first and second zig-zag elements 107A-B, 108A-B, and 109A-B of a respective element pair 105A-C to change the polarization states of the emitted and received RF beams. In order for the RF beam polarization control programming 675 to control polarization state, microcontroller 555 may receive and utilize data transmitted via the I/O interface 672. This data may be generated by the radios 560A-C, sensors included in the antenna system 100 or by independent separate standalone sensors. Additionally, the data can be received by the crossed zig-zag antennas 104A-C, processed by the radios 560A-C, and stored in the memory accessible to the microcontroller 555 for decision-making by the executed RF beam polarization control programming 675. RF waves emanating or received by respective zig-zag antennas 104A-C associated with respective radios 560A-C are with different polarizations by the RF beam polarization control programming 675 and received RF waves are decoded into different polarization states by the RF beam polarization control programming 675.

Although control circuit 550 includes six independently controlled outputs 571A-F and three element pairs 105A-C in the example, the number may vary depending on the number of crossed zig-zag antennas 104A-C. Each additional crossed zig-zag antenna 104*x* results in two additional independently controlled outputs 571*x* and each less crossed zig-zag antenna 104*x* results in two fewer independently controlled outputs 571*x*. The number of crossed zig-zag antennas 104A-C and corresponding element pairs 105A-C varies depending on how many different polarization states of an RF beam is desired. Typically, a total number of first and second zig-zag elements 107A-B, 108A-B, and 109A-B matches a total number of independently controlled outputs 571A-F. But in some examples, there may be fewer (e.g., half as many) independently controlled outputs 571A-C than first and second zig-zag elements 107A-B, 108A-B, and 109A-B in the shared channel implementation depicted in FIG. 5D. For example, a single independently controlled output 571A may drive both first and second zig-zag elements 107A-B, a single independently controlled output 571B may drive both first and second zig-zag elements 108A-B, and a single independently controlled output 571C may drive both first and second zig-zag elements 109A-B. Hence, the number of independently controlled outputs 571A-F and electrical contacts 475A-F may be based on the number of element pairs 105A-C instead of first and second zig-zag elements 107A-B, 108A-B, and 109A-B in the shared channel implementation.

FIG. 6B is similar to FIG. 6A, but the control circuit board 600 does not include independently controlled outputs 571A-F to arbitrate sharing of a single RF input/output strip 420 by the three radio I/O lines 661A-C of respective radios 560A-C. In FIG. 6A, independently controlled outputs 571A-F enable sharing of the single RF input/output strip 420 by indirect electrical connection to respective electrical contacts 475A-B, 475C-D, and 475E-F. However, in FIG. 6B, the radio I/O lines 661A-C of respective radios 560A-C are run via six separate respective RF input/output strips 420A-B, 420C-D, and 420E-F. Each respective RF input/output strip 420A-F directly electrically connects to respective electrical contacts 475A-B, 475C-D, and 475E-F to drive respective elements 107A-B, 108A-B, 109A-B of the respective crossed zig-zag antenna 104A-C.

Figure 7A:
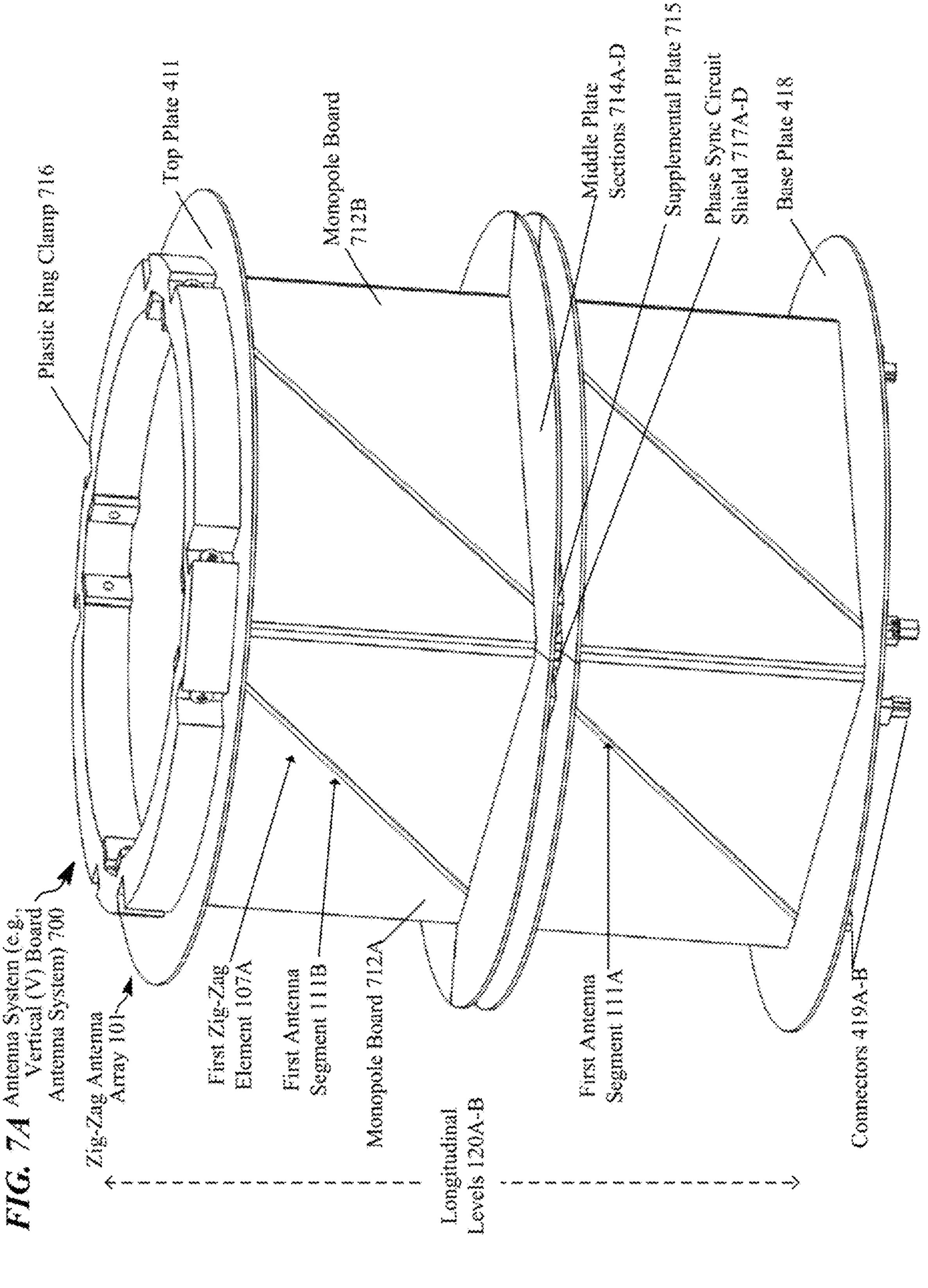
FIG. 7A is an isometric view of a vertical (V) board antenna system that includes a plurality of monopole boards.
Figure 7B:
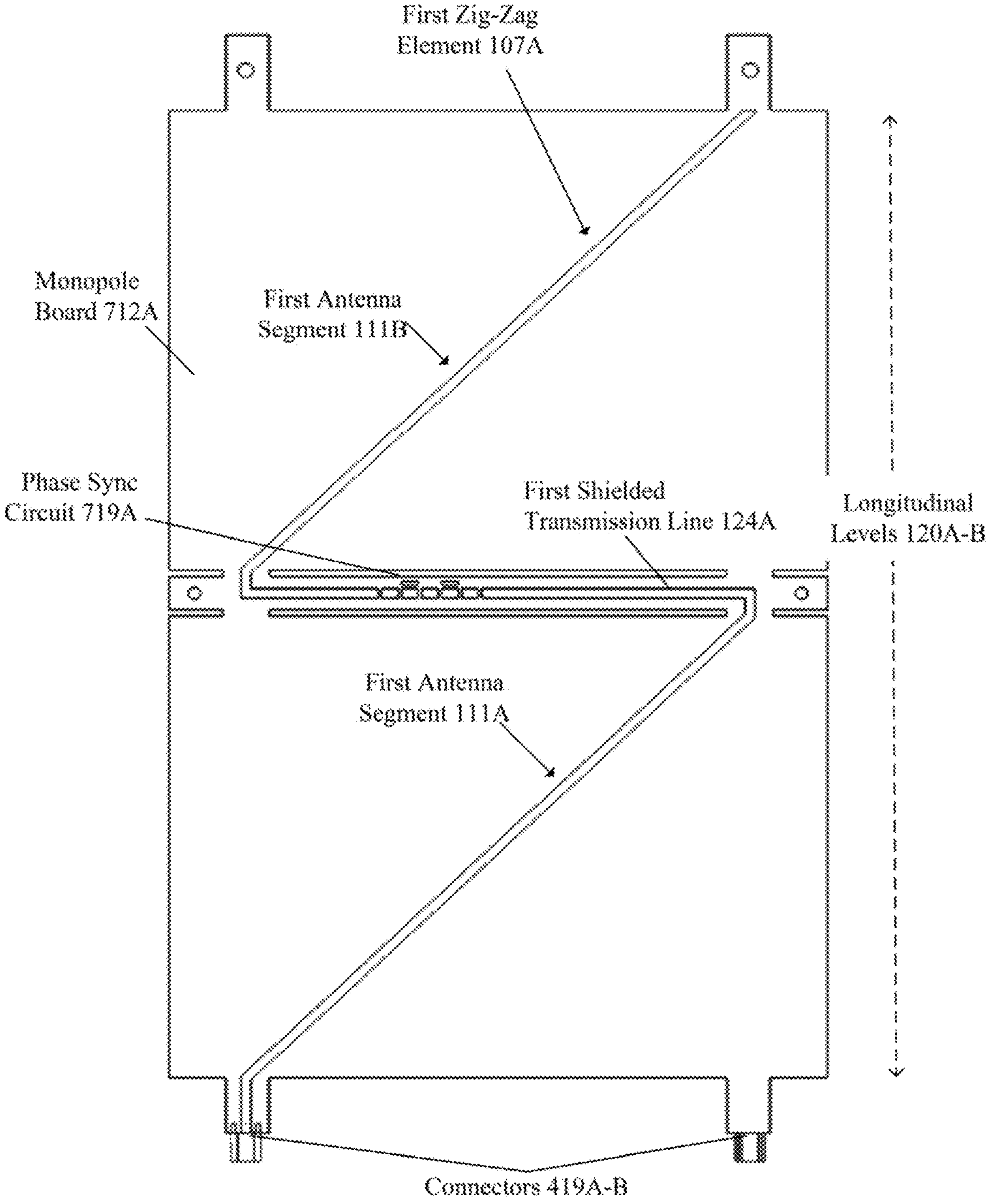
FIG. 7B is a zoomed in view of a monopole board of FIG. 7A.
Figure 7C:
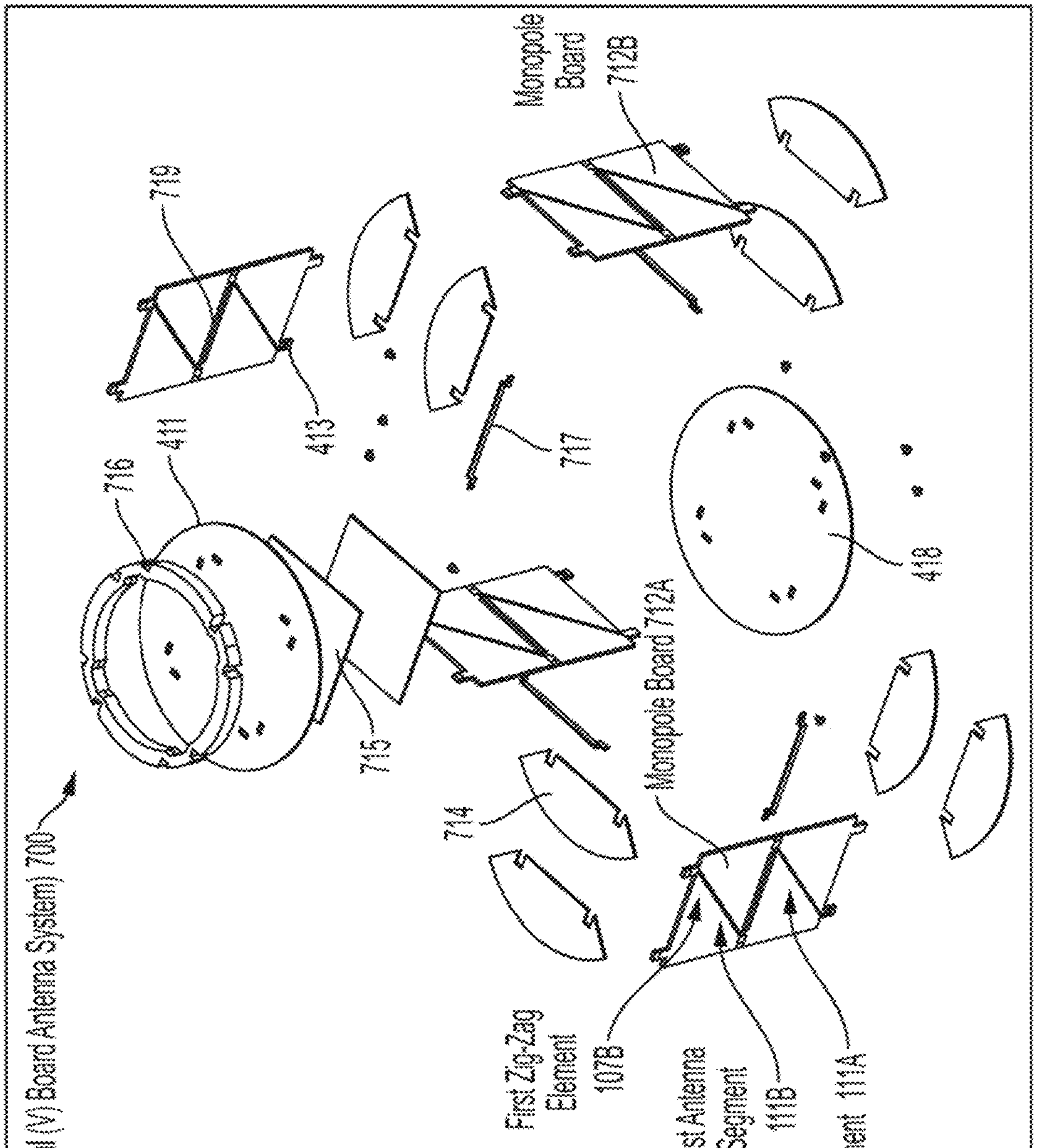
FIG. 7C is an exploded view of the V board antenna system of FIG. 7A showing the various components.

FIGS. 7A-C show an improved manufacturing design in which a zig-zag antenna array 101 is embedded in a plurality of monopole boards 712A-D that are oriented substantially vertically. Monopole board 712A includes a first zig-zag element 107A and a second zig-zag antenna element 107B, where each zig-zag element 107A-B is on a different (e.g., opposing) side of the monopole board 712A. Monopole boards 712B-D likewise include respective first and second zig-zag elements 107A-B on different sides of the respective monopole board 712B-D. Although the drawings do not depict all of the support components or a radome, the other components described herein, such as reflectors, can be included in the vertical (V) board antenna system 700 or related feed.

FIG. 7A is an isometric view of a vertical (V) board antenna system 700 that includes the plurality of monopole boards 712A-D. FIG. 7B is a zoomed in view of a first monopole board 712A. FIG. 7C is an exploded view of the V board antenna system 700 showing the various components.

In the V board antenna system 700, one vertical monopole board 712A includes a first zig-zag element 107A on the outwards facing (e.g., front) side of the monopole board 712A and a second zig-zag element 107B (not shown) on the inwards facing (e.g. back) side of the monopole board 712A. Looking at FIGS. 4C-D, it can be seen that the two pairs of monopoles 107A-B are thus incorporated into a plane, on two different sides of the same monopole circuit board 712A along with first shielded transmission line 124A and second shielded transmission line 134A. Conductive traces or strips can be utilized alternatively or additionally to shielded transmission lines 124A, 134A.

V board antenna system 700 further includes a top plate 411, eight connectors 419A-H, divided into a respective connector set (e.g. pair) 419A-B per monopole board 712A-D. V board antenna system 700 includes four middle plate sections 714A-D, a supplemental plate 715, a plastic ring clamp 716, and a base plate 418. Although not visible in FIG. 7A, the V board antenna system 700 further includes four shielded transmission lines 124A-D, one per respective monopole board 712A-D.

As shown, the first shielded transmission line 124A of the first monopole board 712A includes a phase synchronizing circuit 719A and a phase synchronizing circuit shield 717A. Phase synchronizing circuit 719A can be part of the monopole board 712A and located in between the middle plate section 714A and is shielded by phase synchronization circuit shield 717A (not visible in FIG. 7B). Looking at FIG. 7B, the phase synchronization circuit shield 717A (not shown in FIG. 7B) is between the phase synchronization circuit 719A on each side of the monopole board 712A and includes the metal layer in the center of the monopole board 712A (e.g., a three layer PCB board). Phase synchronization circuit shield 717A isolates the phase synchronization circuits 719A-D from each other. Although not seen in FIG. 7B, the phase synchronization circuit shield 717A can include a layer that is etched so that the metal extends vertically only between the middle plate 714A-D. The middle plate 714A and a strip of metal shown in FIG. 7C complete the phase synchronization circuit shield 717A.

Monopoles (e.g., first antenna segments 111A-B) of first zig-zag element 107A can include traces on the monopole board 712A, wires inserted in a groove on the monopole board 712A, or a combination thereof. Eight connectors 419A-H are disposed on a lower longitudinal portion of the first monopole board 712A for connection to control circuit board 600. Monopoles of first zig-zag element 107A and second zig-zag element 107B are coupled to the control circuit board 600 via a respective connector pair 419A-B. Instead of the connector set 419A-H, the monopoles can be soldered directly to a board/base plate.

The thickness of the monopole boards 712A-D can be in the millimeter (mm) range, which defines the distance between crossed monopoles. The material forming the monopole boards 712A-D is adequate for transmission at the approximate design frequency (which can include more than one frequency). The number of layers (e.g., longitudinal levels 120A-B) of the monopole boards 712A-D is two in FIGS. 7A-C, but the number of layers can vary and depends on the phase synchronization structure. The feed of the V board antenna system 700 can have more layers (e.g., three or more) with longer monopole boards 712A-D. Monopole boards 712A-D can also be carved like monopole boards 812A-D in the VH board antenna system 800 of FIGS. 8A-D.

The top plate 411 and base plate 418 can be one piece and optionally, the base plate 418 can be the control circuit board 600 itself. The middle plate sections 714A-D are put together in parts as shown in the exploded view of FIG. 7C by sliding the middle plate sections 714A-D through slits in the monopole boards 712A-D and adding an additional supplemental plate 715, shown as a square shaped plate.

FIGS. 8A-D show another improved manufacturing design in which a zig-zag antenna array 101 is embedded in a plurality of carved monopole boards 812A-D. A plurality (e.g., four) phase synchronizing boards 815A-D are positioned substantially horizontally and located in between middle plates 413, 416. The substantially vertical horizontal (VH) board antenna system 800 is advantageous in providing more real estate for components or longer conductive traces.

Figure 8A:
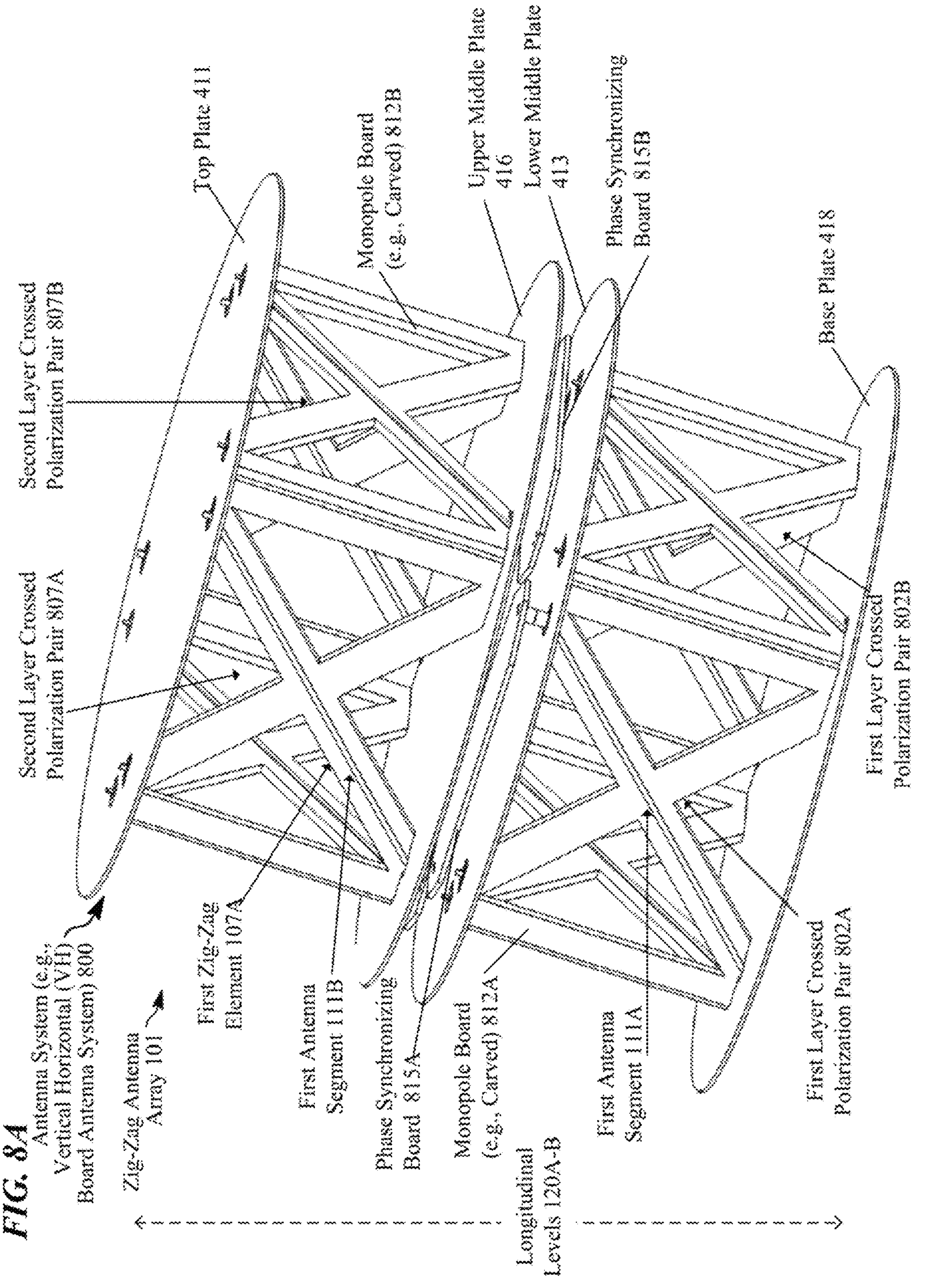
FIG. 8A is an isometric view of a vertical horizontal (VH) board antenna system that includes a plurality of carved monopole boards.
Figure 8B:
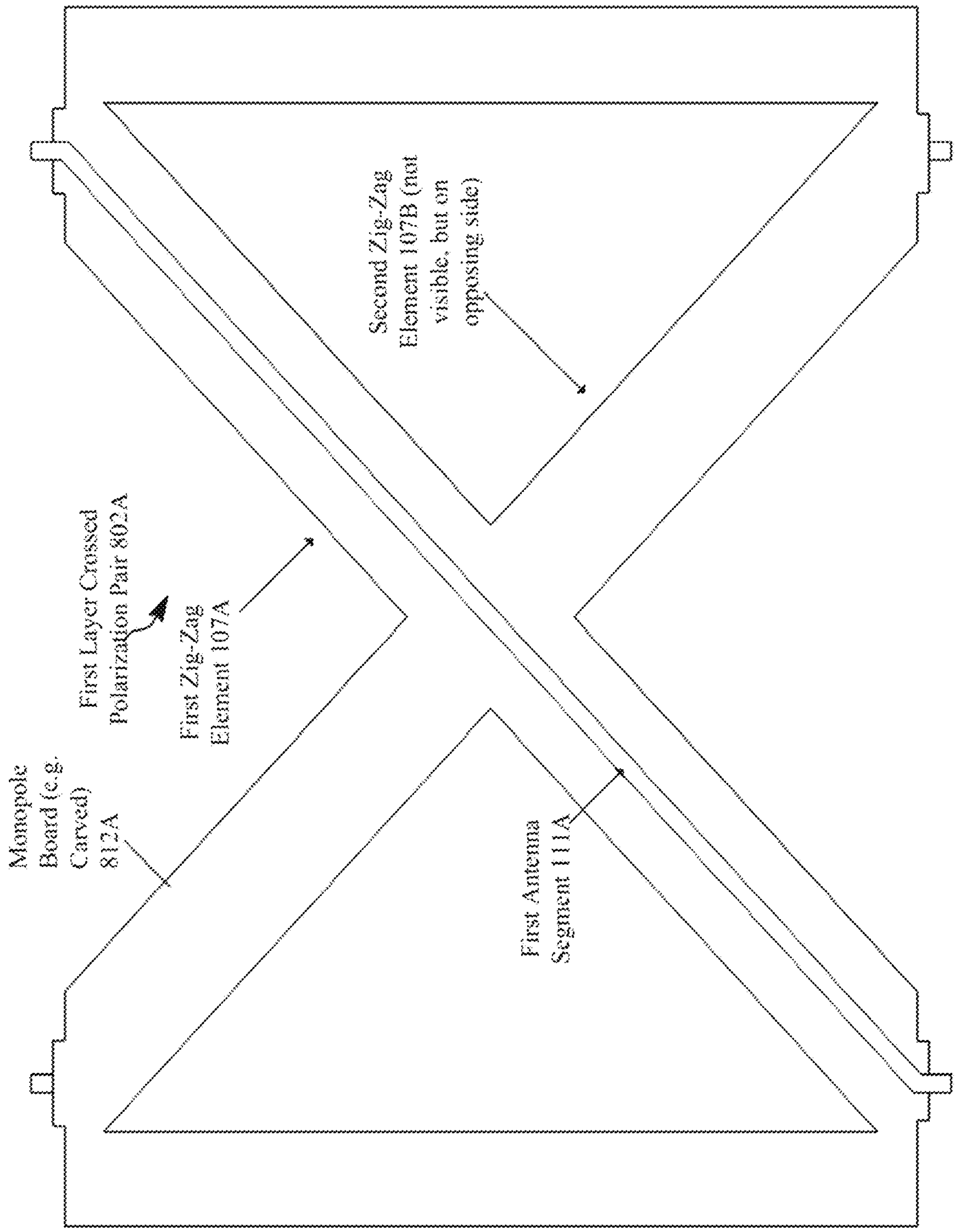
FIG. 8B is a zoomed in view of a carved monopole board of FIG. 8A.
Figure 8C:
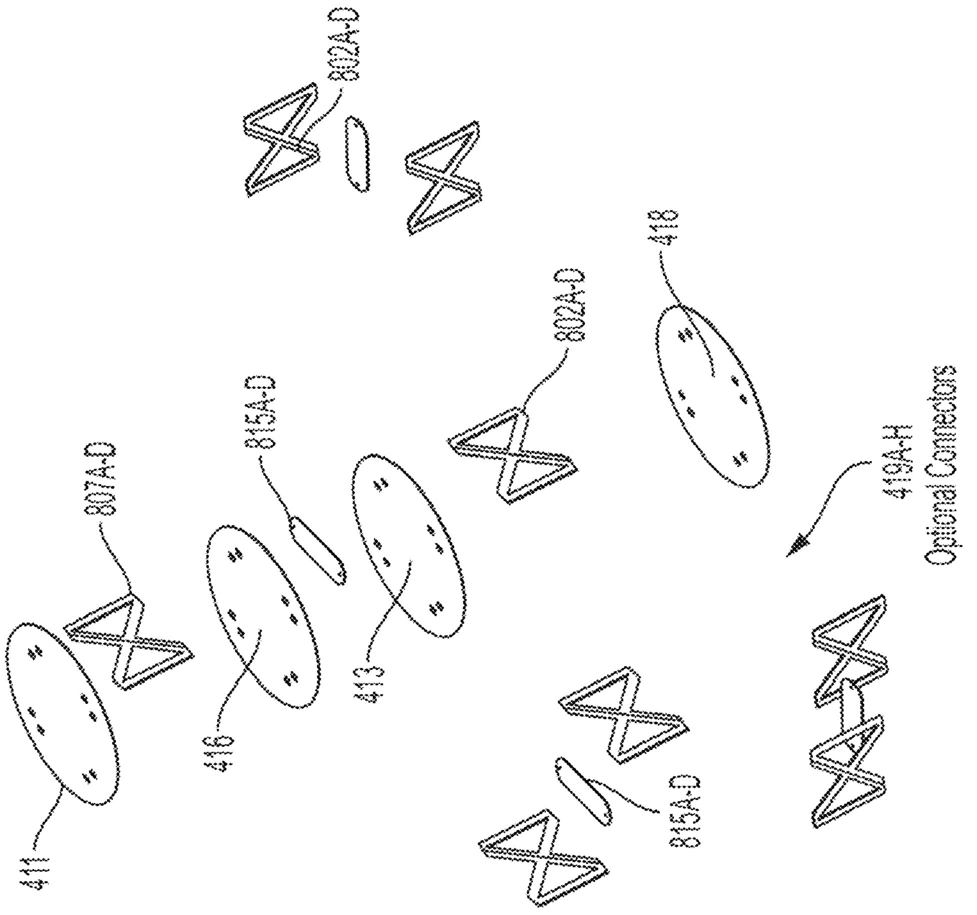
FIG. 8C is an exploded view of the VH board antenna system of FIG. 8A showing the various components.
Figure 8D:
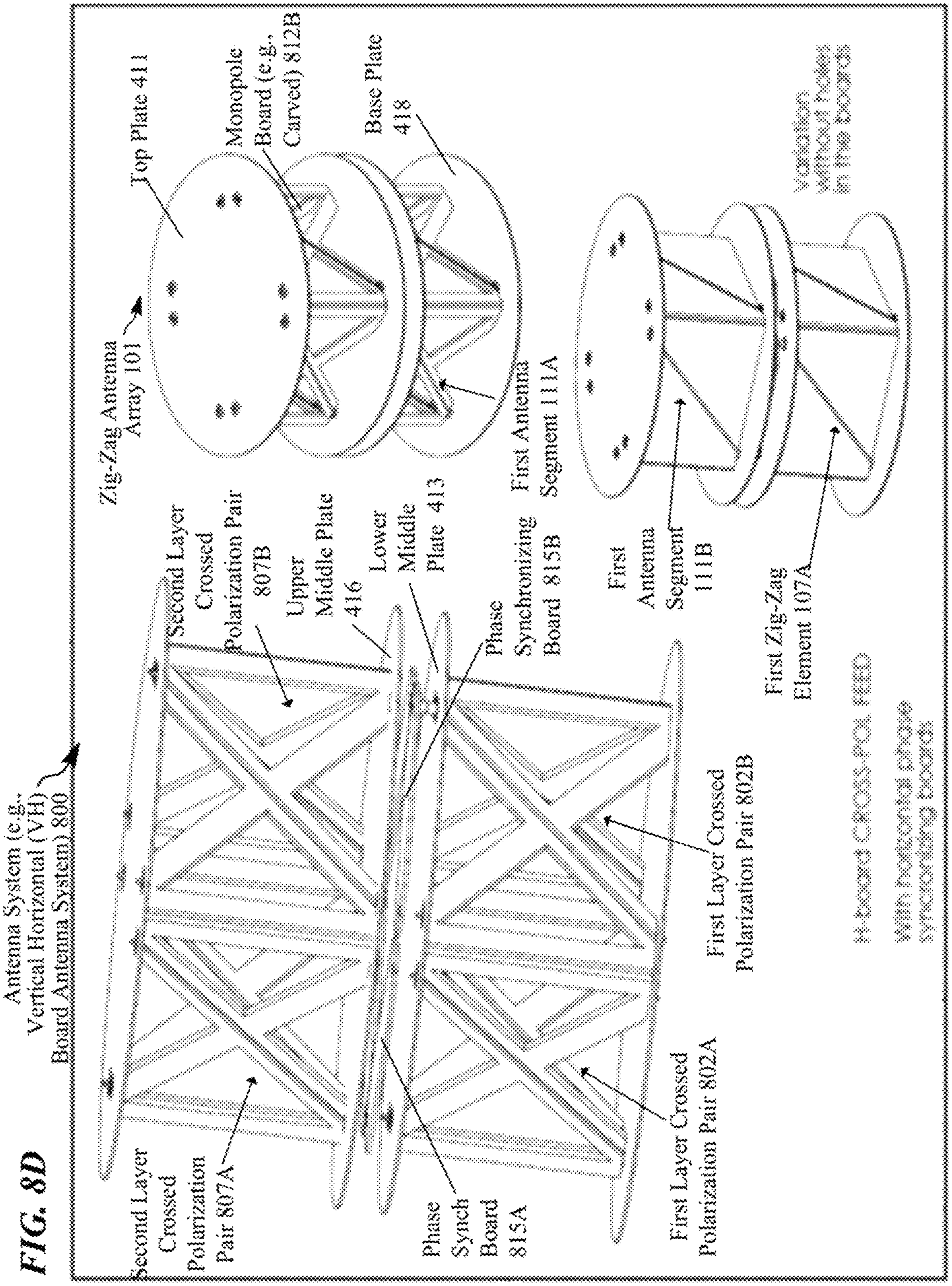
FIG. 8D depicts the VH board antenna system of FIG. 8A and shows details of the horizontal phase synchronization boards.

FIG. 8A is an isometric view of the VH board antenna system 800 that includes the plurality of carved monopole boards 812A-D. FIG. 8B is a zoomed in view of a first carved monopole board 812A. FIG. 8C is an exploded view of the VH board antenna system 800 showing the various components. FIG. 8D depicts the VH board antenna system 800 and shows details of the horizontal phase synchronization boards 815A-B.

In the VH board antenna system 800, one vertical carved monopole board 812A includes a first zig-zag element 107A on the outwards facing (e.g., front) side of the monopole board 812A and a second zig-zag element 107B (not shown) on the inwards facing side (e.g. back) of the carved monopole board 812A. Looking at FIGS. 4C-D, it can be seen that the two pairs of monopoles 107A-B are thus incorporated into a plane, on two different sides of the same carved monopole circuit board 812A along with a first phase synchronizing board 815A. Phase synchronizing board 815A includes first shielded transmission line 124A and second shielded transmission line 134A. Carved monopole board 812A includes a first layer crossed polarization pair 802A on a first longitudinal level 120A and a second layer crossed polarization pair 807B on a second longitudinal level 120B. Other carved monopole boards 812B-D likewise include a respective first layer crossed polarization pair 802B-D on the first longitudinal level 120A and a respective second layer crossed polarization pair 807B-D on the second longitudinal level 120B.

Carved monopole board 812A includes a first zig-zag element 107A and a second zig-zag antenna element 107B. Carved monopole boards 812B-D include respective first and second zig-zag elements 107A-B on different sides of the respective carved monopole board 812B-D. Hence, zig-zag elements 107A, 107B are positioned on opposing sides of the carved monopole board 812A. Although the drawings do not depict all of the support components or a radome, the other components described herein, such as reflectors, can be included in the VH board antenna system 800 or related feed.

VH board antenna system 800 further includes a top plate 411; eight crossed polarization pairs 802A-D, 807A-D; a base plate 418; a lower middle plate 413; and an upper middle plate 416. VH board antenna system 800 further includes four phase synchronizing boards 815A-D, one per respective carved monopole board 812A-D. Lower middle plate 413 and upper middle plate 416 divide the VH board antenna system 800 into first layer crossed polarization pairs 802A-D on a first lower longitudinal level 120A and a second layer crossed polarization pair 807A-D on a second upper longitudinal level 120B (one per respective carved monopole board 812A-D). Hence, the first carved monopole 812A includes a first layer crossed polarization pair 802A and a second layer crossed polarization pair 807A.

The monopoles (e.g., first antenna segments 111A-B) of first zig-zag element 107A can include conductive traces on the carved monopole board 812A, wires inserted in a groove on the carved monopole board 812A, or a combination thereof with wires being at the end of the traces to solder to the substantially horizontal phase synchronizing board 815A or small edge connectors with mates on the substantially horizontal phase synchronizing board 815A (e.g., G4PO). If the ends are traces, the traces do not stick out of the carved monopole board 812A as shown in FIG. 8B.

The thickness of the carved monopole boards 812A-D can be in the millimeter (mm) range, which defines the distance between crossed monopoles (e.g., crossed polarization pairs 802A, 807B). The material forming the carved monopole boards 812A-D is adequate for transmission at the approximate design frequency (which can include more than one frequency). The number of layers (e.g., longitudinal levels 120A-B) of the carved monopole boards 812A-D is two in FIGS. 8A-D, but the number of layers can vary and depends on the phase synchronization structure. The feed of the VH board antenna system 800 can have more layers (e.g., three or more) with longer carved monopole boards 812A-D. Carved monopole boards 812A-D do not have to be carved and can be like monopole boards 712A-D in the V board antenna system 700 of FIGS. 7A-C, as shown in the variation without holes in the boards seen in the bottom right side of FIG. 8D.

Phase synchronizing board 815A synchronizes the phase between the monopoles in the first and second layers, e.g., first layer crossed polarization pair 802A and second layer crossed polarization pair 807A. Phase synchronizing board 815 can be one board similar in size to the plates 411, 418, 413, and 416. Alternatively, phase synchronizing board 815 can be four separate phase synchronizing boards 815A-D like that shown, one for each crossed polarization pair 802A, 807A. The connections to the monopoles (4 per carved monopole circuit board 812A-D or per crossed polarization pair 802A, 807A) can be soldered or surface mount connectors. Material forming the phase synchronizing board 815A can be different from the material forming the monopole board 812A (e.g., more adequate for the phase control function).

The top plate 411, base plate 418, lower middle plate 413, and upper middle 416 plate can be made in one piece with the necessary openings for tabs or connectors to couple to the carved monopole boards 812A-D and phase synchronizing boards 815A-D. The base plate 418 can be a board with one side metal and the other opposing side with circuits. One of the middle plates 413, 416 can include a circuit board with metal on one side and the phase adjusting circuits can be on the other one of the middle plates 413, 416.

Like V board antenna system 700, VH board antenna system 800 can include eight optional connectors 419A-H that are disposed on a lower longitudinal portion of the first carved monopole boards 812A-D for connection to control circuit board 600. The monopoles of first zig-zag element 107A and second zig-zag element 107B are coupled to the control circuit board 600 via a respective connector pair 419A-B. Instead of the connector set 419A-H, the monopoles can be soldered directly to a board/base plate.

Any of the microprocessor and RF beam polarization control programming 675 can be embodied in on one or more methods as method steps or in one more programs. According to some embodiments, program(s) execute functions defined in the program, such as logic embodied in software or hardware instructions. Various programming languages can be employed to create one or more of the applications, structured in a variety of manners, such firmware, procedural programming languages (e.g., C or assembly language), or object-oriented programming languages (e.g., Objective-C, Java, or C++). The program(s) can invoke API calls provided by the operating system to facilitate functionality described herein. The programs can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An antenna system comprising:

a zig-zag antenna array including:

a conductive disk stack of conductive disks;

at least one crossed zig-zag antenna extending through the conductive disk stack of conductive disks, the at least one crossed zig-zag antenna including:

an element pair that includes a plurality of crossed zig-zag antenna segment pairs between the conductive disk stack of conductive disks, wherein a respective crossed zig-zag antenna segment pair extends between a respective lower conductive disk and a respective upper conductive disk; and a control circuit coupled to the element pair to switch the crossed zig-zag antenna segment pairs to drive the crossed zig-zag antenna segment pairs to transmit or receive radio frequency (RF) waves with polarization states that include vertical, horizontal, elliptical, and circular polarization.

2. The antenna system of claim 1, wherein:

the element pair includes:

a first zig-zag element formed of multiple first antenna segments, and a second zig-zag element formed of multiple second antenna segments;

a respective first antenna segment extends diagonally from the respective lower conductive disk to the respective upper conductive disk; and a respective second antenna segment extends diagonally from the respective lower conductive disk to the respective upper conductive disk.

3. The antenna system of claim 2, wherein:

the respective first antenna segment and the respective second antenna segment cross each other in orthogonal directions between each of the conductive disks to form the respective crossed zig-zag antenna segment pair between the respective lower conductive disk and the respective upper conductive disk.

4. The antenna system of claim 2, wherein the zig-zag antenna array further includes:

a plurality of first conductive disk interconnects to electrically connect the first antenna segments with each other; and a plurality of second conductive disk interconnects to electrically connect the second antenna segments with each other.

5. The antenna system of claim 4, wherein:

the first antenna segments of the first zig-zag element are oriented substantially orthogonal with respect to each other;

each of the first conductive disk interconnects or a first subset include a respective first feedthrough line in a respective conductive disk that extends substantially longitudinally across the respective conductive disk to electrically connect the first antenna segments together;

the second antenna segments of the second zig-zag element are oriented substantially orthogonal with respect to each other; and each of the second conductive disk interconnects or a second subset include a respective second feedthrough line in the respective conductive disk that extends substantially longitudinally across the respective conductive disk to electrically connect the second antenna segments together.

6. The antenna system of claim 5, wherein:

the first zig-zag element and the second zig-zag element are controlled as a shared channel by the control circuit to transmit or receive the RF waves as a shared RF output beam with a common polarization state.

7. The antenna system of claim 4, wherein:

the first antenna segments of the first zig-zag element are oriented substantially parallel with respect to each other;

each of the first conductive disk interconnects or a first subset include a respective first shielded transmission line in a respective conductive disk that extends substantially laterally across the respective conductive disk to electrically connect the first antenna segments together;

the second antenna segments of the second zig-zag element are oriented substantially parallel with respect to each other; and each of the second conductive disk interconnects or a second subset include a respective second shielded transmission line in the respective conductive disk that extends substantially laterally across the respective conductive disk to electrically connect the second antenna segments together.

8. The antenna system of claim 7, wherein:

the first zig-zag element and the second zig-zag element are independently controllable as separate channels by the control circuit to transmit or receive respective RF waves as a respective independent RF output beam with a different respective polarization state.

9. The antenna system of claim 2, wherein:

a longitudinal disk spacing between each of the conductive disks is approximately a wavelength of the RF waves multiplied by 0.354 (λ*0.354);

a segment thickness of each of the first antenna segments and the second antenna segments is approximately the wavelength of the RF waves divided by ten (λ/10) or less; and a segment length of each of the first antenna segments and the second antenna segments is approximately the wavelength of the RF waves divided by approximately two (λ/2).

10. The antenna system of claim 2, wherein:

the respective lower conductive disk and the respective upper conductive disk each include:

a respective first element hole for the respective first antenna segment to extend between, and a respective second element hole for the respective second antenna segment to extend between; and a lateral element hole spacing between the respective first element hole and the respective second element hole is approximately a wavelength of the RF waves multiplied by 0.354 (λ*0.354).

11. The antenna system of claim 1, wherein:

each of the conductive disks is positioned at a varying longitudinal level along a height of the zig-zag antenna array; and each of the conductive disks has a respective disk lateral surface area or a respective disk perimeter that is shaped as a circle, oval, polygon, or a portion thereof.

12. The antenna system of claim 11, wherein:

each of the conductive disks or a subset are aligned to have substantially overlapping profiles of the respective disk lateral surface area or the respective disk perimeter along the height of the zig-zag antenna array.

13. The antenna system of claim 11, wherein:

the conductive disk stack of conductive disks includes:

a bottom conductive disk at a lowest longitudinal level for an electrical connection to the control circuit, and a top conductive disk at an uppermost longitudinal level for an electrical termination of the element pair;

a bottom disk diameter of the bottom conductive disk is approximately a wavelength of the RF waves multiplied by three (λ*3); and a top disk diameter of the top conductive disk is approximately the wavelength of the RF waves multiplied by 0.85 (λ*0.85).

14. The antenna system of claim 11, wherein the respective disk lateral surface area or the respective disk perimeter of a subset of conductive disks is tapered.

15. The antenna system of claim 11, wherein:

each of the conductive disks includes a respective lower lateral surface and a respective upper lateral surface;

the conductive disk stack of conductive disks includes:

a bottom conductive disk at a lowest longitudinal level for an electrical connection to the control circuit, and a top conductive disk at an uppermost longitudinal level for an electrical termination of the element pair;

the bottom conductive disk includes the respective crossed zig-zag antenna segment pair positioned on the respective upper lateral surface and the electrical connection to the control circuit on the respective lower lateral surface; and the top conductive disk includes the respective crossed zig-zag antenna segment positioned below the respective lower lateral surface and the electrical termination of the element pair on the respective upper lateral surface.

16. The antenna system of claim 1, wherein:

the zig-zag antenna array includes a plurality of crossed zig-zag antenna, each crossed zig-zag antenna extending through the conductive disk stack of conductive disks;

each crossed zig-zag antenna includes a respective element pair including a respective first zig-zag element and a respective second zig-zag element;

each crossed zig-zag antenna is independently controllable as a separate channel by the control circuit through the respective element pair to transmit or receive the RF waves as a respective independent RF output beam with a different respective polarization state; and the control circuit includes:

a microcontroller, and a plurality of independently controlled outputs coupled to the microcontroller, each independently controlled output operated by the microcontroller and coupled to a respective crossed zig-zag antenna to transmit or receive respective RF waves via the respective element pair.

17. The antenna system of claim 16, wherein:

the respective first zig-zag element and the respective second zig-zag element form a respective set of respective crossed zig-zag antenna segment pairs between the conductive disk stack of conductive disks;

each conductive disk or a subset includes a respective set of element holes for each respective element pair, the respective set of element holes including:

a first element hole for a respective first antenna segment of the respective first zig-zag element, and a second element hole for a respective second antenna segment of the respective second zig-zag element;

a zig-zag antenna array perimeter is defined by sets of element holes on each conductive disk; and the zig zig-zag antenna array perimeter is shaped as a circle, oval, polygon, or a portion thereof.

18. The antenna system of claim 16, wherein:

the respective first zig-zag element and the respective second zig-zag element are controlled as a shared channel by the control circuit to transmit or receive the respective RF waves as a shared RF output beam with a common polarization state.

19. The antenna system of claim 16, wherein:

the respective first zig-zag element and the respective second zig-zag element are independently controllable as separate channels by the control circuit to transmit or receive the respective RF waves as a respective independent RF output beam with a different respective polarization state.

20. The antenna system of claim 16, wherein:

each independently controlled output is configured to turn on or off based on a respective switching control signal from the microcontroller;

the independently controlled outputs are switches, relays, multiplexers, demultiplexers, or transistors; and based on the respective switching control signal, each independently controlled output is configured to control the respective element pair to transmit or receive the respective RF waves.

* * * * *